United States Patent
O'Hare et al.

(10) Patent No.: US 9,879,100 B2
(45) Date of Patent: Jan. 30, 2018

(54) CATALYST SYSTEM FOR THE POLYMERISATION AND/OR OLIGOMERISATION OF OLEFINS AND PROCESS UTILIZING THE CATALYST SYSTEM

(71) Applicant: SCG Chemicals Co., Ltd., Bangkok (TH)

(72) Inventors: Dermot O'Hare, Oxford (GB); Jean-Charles Buffet, Oxford (GB); Zoe Turner, Oxford (GB)

(73) Assignee: SCG Chemicals Co., Ltd., Bangkok (TH)

( * ) Notice: Subject to any disclaimer, the term of this patent is extended or adjusted under 35 U.S.C. 154(b) by 0 days.

(21) Appl. No.: 15/310,814

(22) PCT Filed: May 13, 2015

(86) PCT No.: PCT/EP2015/060640
§ 371 (c)(1),
(2) Date: Nov. 14, 2016

(87) PCT Pub. No.: WO2015/173323
PCT Pub. Date: Nov. 19, 2015

(65) Prior Publication Data
US 2017/0088644 A1    Mar. 30, 2017

(30) Foreign Application Priority Data

May 15, 2014 (GB) .................... 1408616.9

(51) Int. Cl.
| C08F 4/646 | (2006.01) |
| C08F 4/6592 | (2006.01) |
| C08F 4/69 | (2006.01) |
| C08F 210/02 | (2006.01) |
| C08F 110/02 | (2006.01) |

(52) U.S. Cl.
CPC ............ *C08F 110/02* (2013.01); *C08F 4/646* (2013.01); *C08F 4/65925* (2013.01); *C08F 4/65927* (2013.01); *C08F 4/69* (2013.01); *C08F 210/02* (2013.01); *C08F 2420/04* (2013.01)

(58) Field of Classification Search
CPC .. C08F 4/646; C08F 4/65925; C08F 4/65927; C08F 210/02
See application file for complete search history.

(56) References Cited

FOREIGN PATENT DOCUMENTS

| WO | WO-02/04119 A1 | 1/2002 |
| WO | WO-2004056480 A1 | 7/2004 |
| WO | WO-2014175495 A1 | 10/2014 |

OTHER PUBLICATIONS

Sperber, O., et al., "Synthesis of Long-Chain Branched Comp-Structured Polyethylene from Ethylene by Tandem Action of Two Single-Site Catalysts," Macromolecules 2003, 36, 9014-9019.
Wet-Roos, Deon de, et al., "Homogeneous Tandem Catalysis of Bis(2-decylthioethyl)amine-Chromium Trimerization Catalyst in Combination with Metallocene Catalysts," Macromolecules 2004, 37, 9314-9320.
International Search Report dated Jul. 7, 2015 from corresponding International Application No. PCT/EP2015/060640.

*Primary Examiner* — Caixia Lu
(74) *Attorney, Agent, or Firm* — Foley & Hoag LLP

(57) ABSTRACT

The present invention relates to a synergistic dual olefin copolymerization catalyst system comprising a solid support material having, on its surface, two or more catalytic metal complexes wherein the two or more catalytic metal complexes comprise at least one first transition metal complex and a second transition metal complex different from the first transition metal complex; use of such a system as a catalyst; a process for producing a polymer of an olefin utilizing the catalyst system.

15 Claims, 22 Drawing Sheets

CATALYST SYSTEM FOR THE POLYMERISATION AND/OR OLIGOMERISATION OF OLEFINS AND PROCESS UTILIZING THE CATALYST SYSTEM

RELATED APPLICATIONS

This application is a §371 national stage application based on Patent Cooperation Treaty Application serial number PCT/EP2015/060640, filed May 13, 2015, which claims the benefit of priority to GB 1408616.9, filed May 15, 2014.

The present invention relates to a catalyst system for the polymerization and/or oligomerization of olefins and a process utilizing this catalyst system.

Dual catalysis systems for olefin polymerisation are known in the art.

U.S. Pat. No. 6,291,608 discloses a process for preparing polyolefins having a multi-modal molecular weight distribution comprising contacting at least one mono-1α-olefin in a polymerisation zone, under polymerisation conditions, with a dual catalyst system. The dual catalyst system used in the process comprises a first catalyst system which comprises a metallocene catalyst and a cocatalyst and a second catalyst system which comprises diimine nickel complexes which further comprise additional ligands selected from the group consisting of deprotonated-β-diketones, deprotonated-β-ketoesters, halogens and mixtures thereof. The resultant, recovered polymer has at least a bimodal, or broad, molecular weight distribution.

WO 2006/054048A discloses supported catalyst systems for the polymerisation of olefins. These catalyst systems comprise (a) at least two different monocyclopentadienyl transition metal complexes, (b) one or more activators comprising an ionic compound comprising (i) a cation and (ii) an anion having up to 100 non-hydrogen atoms and the anion containing at least one substituent comprising a moiety having an active hydrogen, and (c) one or more support materials. The catalyst systems may be used to prepare LLDPE polymers having broad metal flow properties.

According to US 2006/0122054A, bimodal polyolefins having a reverse or partial reversed comonomer incorporation may be prepared in the presence of a dual catalyst on the same support wherein each catalyst has a different response to temperature, ethylene partial pressures, partial pressure of non-polymerisable hydrocarbons present in the reaction mixture and hydrogen partial pressure. The dual catalyst comprises, as a first component, a transition metal complex with a salicylaldamine compound and, as a second component, a group 4 metal-phosphinimine complex.

US 2010/0190937A discloses the (co)polymerisation of ethylene using a catalyst system comprising a chromium catalyst and a Group 4 transition metal catalyst, co-supported on an inorganic oxide support. The co-supported catalyst system gives access to polyethylene having a broad or bimodal molecular weight distribution.

Mixtures of different polyolefins may be made according to the process described in US 2011/0130528A. The process involves direct, preferably simultaneous, polymerisation of one or more polymerisable olefins using two or more transition metal-containing active polymerisation catalyst systems at least one of which contains cobalt or iron complexed with selected ligands. The polyolefin products contain polymers that may vary in molecular weight, molecular weight distribution, crystallinity, or other factors.

WO 2011/072851A describes a process for the preparation of dual supported catalysts for use in the homo or copolymerisation of α-olefins. The supported catalyst comprises at least one late transition metal complex, e.g. a tridentate iron complex, and one or more other catalytically-active components selected from metallocenes, Ziegler-Natta-catalysts and monocyclopentadienyl chromium constrained geometry complexes.

Disadvantages associated with prior art dual catalyst systems useful in the polymerisation of α-olefins include their tendency to produce polymer mixtures rather than a single polymer and their variable activities. These disadvantages may result from the fact that in many dual catalyst systems the catalysts catalyse reactions independently of each other rather than cooperatively. There is a need to overcome these and other disadvantages. It is therefore an object of the present invention to provide a catalyst system for the polymerisation and/or oligomerisation of ethylene which overcomes the drawbacks of the prior art, especially the catalyst system shall allow cooperative and synergistic action. Further, it is an object to provide a process for polymerisation and/or oligomerisation of olefins utilizing the catalyst system.

The first object is achieved by a catalyst system according to claim 1. The second object is achieved by the use and the process according to claims 11 and 12. Preferred embodiments are disclosed in the subclaims.

The present invention is based on the surprising discovery that catalysts comprising two or more solid-supported metal complexes, where one complex oligomerises ethene to one or more α-olefins while the other complex polymerises ethene; the oligomers formed in situ can be incorporated in the growing polymer chain to produce a single copolymer of ethylene/α-olefins while using only a single ethylene feed and that such catalysts can be "tuned" by changing the catalyst ratios so as to obtain different polyethylene products.

The dual polymerization catalyst system of the invention, as stated above, comprises two or more catalytic metal complexes. At least one of these catalytic metal complexes will be a first transition metal complex. By the term "transition metal" we mean a d-block metal, examples of which include, but are not limited to, zirconium, chromium, iron, cobalt, nickel, titanium and hafnium. The transition metal will be complexed with one or more ligands, or aromatic or heteroaromatic cyclic compounds. Such aromatic compounds, useful for complexing with the transition metal, include optionally-substituted cyclopentadiene, optionally substituted indene and optionally-substituted pentalene. The aromatic compound used to complex the transition metal may, further, contain two linked, optionally-substituted cyclopentadiene groups or two linked, optionally-substituted indene and optionally-substituted pentalene groups. In such linked moieties, the linking group may be provided by a lower alkylene group. According to one preferred embodiment, the transition metal complex used in the dual catalyst system will be selected from

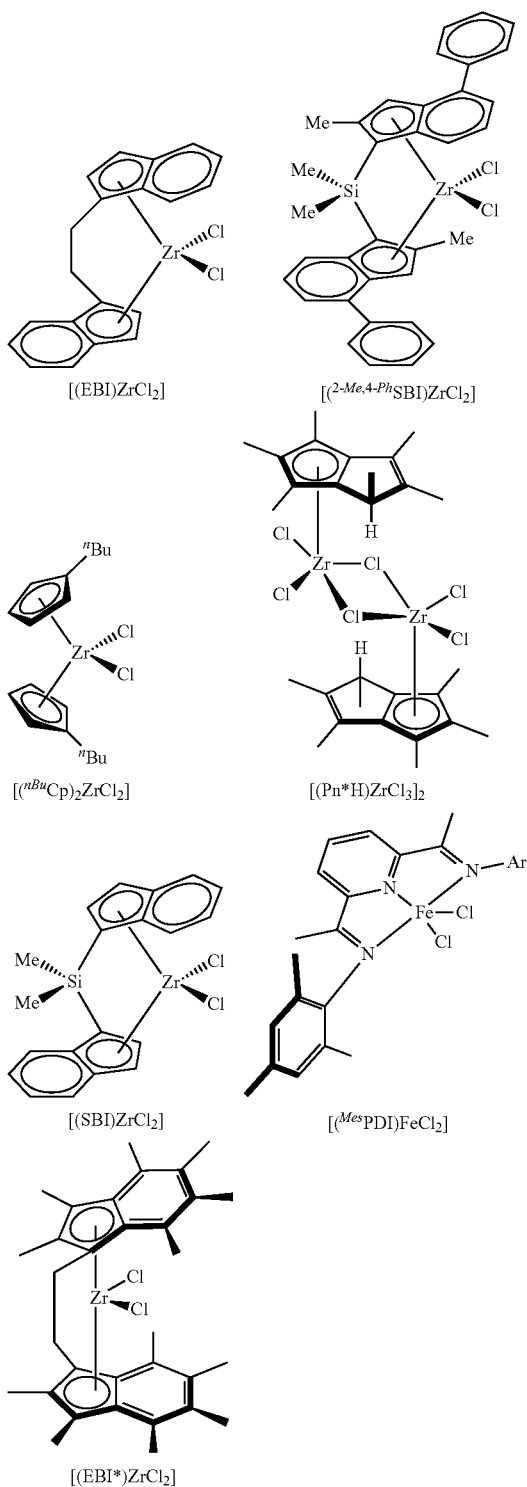
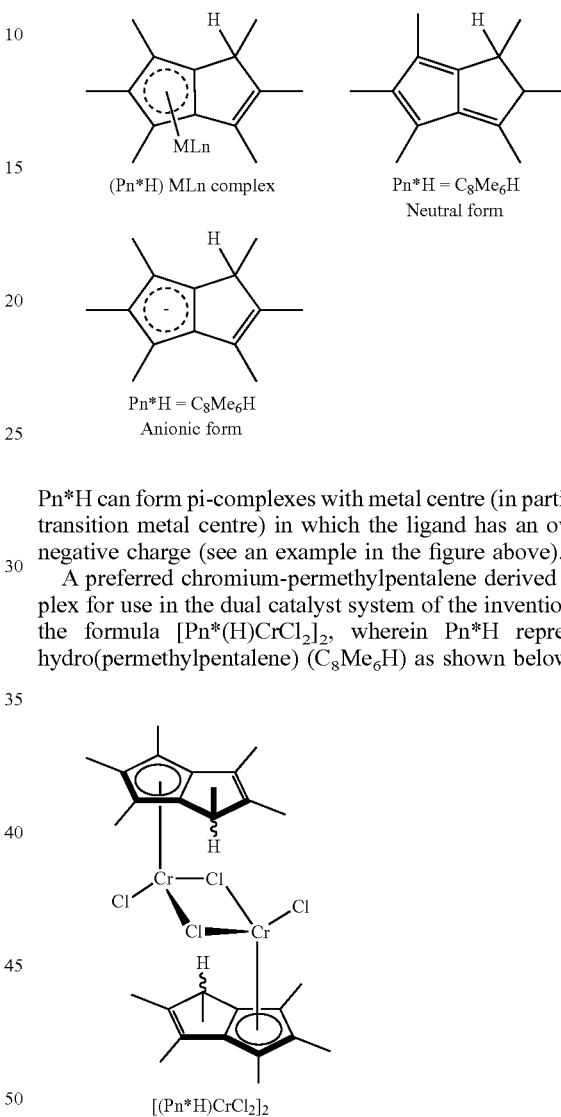

As stated above, the synergistic dual catalyst system of the invention may contain more than one first transition metal complex.

The synergistic dual catalyst system also contains a second transition metal complex, wherein the second transition metal complex is preferably selected from transition metal-permethylpentalene derived complexes. According to a preferred embodiment of the invention, the second transition metal complex is a chromium containing complex, preferably a chromium-permethylpentalene derived complex or a chromium cyclopentadienyl complex.

Permethylpentalene derived ligands may be a protio form or anionic form (see examples figure below). The protio form such as hydro(permethylpentalene) denoted as Pn*H has the formula $C_8Me_6H$ as shown below. It can exist as neutral or anionic forms.

Pn*H can form pi-complexes with metal centre (in particular transition metal centre) in which the ligand has an overall negative charge (see an example in the figure above).

A preferred chromium-permethylpentalene derived complex for use in the dual catalyst system of the invention has the formula $[Pn^*(H)CrCl_2]_2$, wherein Pn*H represents hydro(permethylpentalene) ($C_8Me_6H$) as shown below The catalytic compounds, i.e. one or more first transition metal complex and the second transition metal complex, are supported on a solid support material. Typically, the solid support material will be an inorganic oxide or inorganic hydroxide, for example silica, alumina or a layered double hydroxide which may be thermally treated or optionally solvent treated.

Layered double hydroxides (LDHs) are a class of compounds which comprise at least two metal cations and have a layered structure. A brief review of LDHs is provided in *Chemistry in Britain*, September 1997, pages 59 to 62. The hydrotalcites, perhaps the most well-known examples of LDHs, have been studied for many years.

LDHs can be represented by the general formula $[M^{II}_{(1-x)} M^{III}_x(OH)_2]^{x+}(A^{z-})_{x/z} \cdot yH_2O \cdot w$ (solvent or $[M^I_{(1-x)}M^{III}_x$ $(OH)_2]^{n+}(A^{z-})_{n/z}\cdot yH_2O\cdot w(solvent)$, where $M^I$, $M^{II}$ and $M^{III}$ are mono, di- and trivalent metal cations respectively, that occupy octahedral positions in hydroxide layers, $A^{z-}$ is an interlayer charge-compensating anion, where z is an integer, $n=2x-1$, x is a number less than 1 and y is 0 or a number greater than 0, solvent is 100% v miscible in water and is typically acetone or methanol, $w=0-1$. Examples of $A^{z-}$ include $CO_3^{2-}$, $NO_3^-$ and $Cl^-$. A large number of LDHs with a wide variety of $M^I$-$M^{III}$ cation pairs (e.g., Mg—Al, Ca—Al) as well as the $M^I$-$M^{III}$ cation pair (Li—Al) with different anions in the interlayer space have been reported and studied. Preferred layered double hydroxides, for use as solid support material for the catalytic compounds as those having the general formula

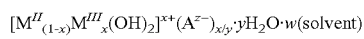

in which $M^{II}$ a divalent metal cation;
$M^{III}$ is a trivalent metal cation;
A is a counter anion; and
x is a number less than 1, w is a number less than 1, which gives compounds optionally hydrated with a stoichiometric amount or a non-stoichiometric amount of water and/or an aqueous-miscible organic solvent (AMO-solvent), such as acetone.

Preferably, in the LDH of the above formula, $M^{II}$ is Mg or Ca and $M^{III}$ is Al. The counter anion A is typically selected from $CO_3^{2-}$, $OH^-$, $F^-$, $Cl^-$, $Br^-$, $I^-$, $SO_4^{2-}$, $NO_3^-$ and $PO_4^{3-}$. According to a preferred embodiment, the LDH used as a solid support material will be one wherein $M^{II}$ is Mg, $M^{III}$ is Al and A is $CO_3^{2-}$. The BET surface of the LDHs is typically greater than 100 $m^2g^{-1}$.

In an even preferred embodiment, the LDH used as support material may have the formula

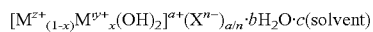

wherein M and M' are two different charged metal cations, wherein M may be a mixture of one or more metal cations of charge z and M' may be a mixture of one or more metal cations of charge y, $z=1$ or 2; $y=3$ or 4; $0<x<0.9$; b is 0 to 10; c is 0 to 10; X is an anion with $n>0$, preferably 1-5; $a=z(1-x)+xy-2$, wherein the solvent is preferably an aqueous miscible organic solvent. Preferably, in the LDH of the above formula, M is Mg or Ca, and M' is Al. The counter anion X is typically selected from $CO_3^{2-}$, $OH^-$, $F^-$, $Cr^-$, $Br^-$, $I^-$, $SO_4^{2-}$, $NO_3^-$ and $PO_4^{3-}$. According to a preferred embodiment, the LDH used as a solid support material will be one wherein M is Mg, M' is Al and X is $CO_3^{2-}$. The BET surface of the LDH is typically greater than 100 $M^2g^{-1}$.

Preferably, the solid support will, in addition to the catalysts described above, be activated by treatment with an activator compound, such as an alkylaluminoxane, for example methylaluminoxane. The solid support material may, alternatively, be a solid alkylaluminoxane itself, for example solid methylaluiminoxane.

The catalytic compounds will be present on the surface of the solid support material. For instance, they may be present on the surface as a result of adsorption, absorption or chemical interactions.

According to a preferred embodiment, the weight ratio (or molar ratio) of the first transition metal complex second transition metal complex (such as a chromium permethylpentalene complex) may vary typically from 95:5 to 50:50. Preferably, the weight ratio is 90:10 to 70:30, more preferably 90:10 to 75:25.

We have found that a synergistic dual catalyst system wherein the first transition metal complex is the compound $[(^{Mes}PDI)FeCl_2]$, the second transition metal complex is the chromium hydro(permethylpentalene) compound $[Pn^*(H)CrCl_2]_2$, the weight ratio of the first transition metal complex to the chromium hydro(permethylpentalene) is 75:25 and wherein the catalytic compounds are supported on MgAl—$CO_3$ LDH/MAO has a high productivity of 0.545 $kg_{PE}/g_{CAT}/h$. According to a preferred embodiment of the invention, the synergistic dual catalyst system comprises a weight ratio of $[(^{Mes}PDI)FeCl_2]:[Pn^*(H)CrCl_2]_2$ of 75:25, or a weight ratio of $[(EBI)ZrCl_2]:[Pn^*(H)CrCl_2]_2$ of 75:25, or a weight ratio of $[(^{nBu}Cp)_2ZrCl_2]:[Pn^*(H)CrCl_2]_2$ of 80:20.

The productivity also depends on the ratio of the amount of complex on the support material. For instance, solid MAO with a ratio $[Al]_0/[M]_0$ of 300 has an activity ($kg_{PE}/mol_{Zr\ complex}/h$) of 21900 which is 3.5 times faster than one with a ratio of 100.

The molar ratio of the first transition metal complex: second transition metal complex may vary typically from 95:5 to 5:95. It was found that the molar ratio of the first transition metal complex:second transition metal complex has an effect on the activity and can be used to vary the polymer structure achieved in the polymerisation of olefins, especially ethylene.

We have confirmed that the dual catalyst system with two transition metal complexes on the surface of the same solid particle has improved polymerisation productivity, when compared to mixing the separately supported catalysts (maintaining the same $[Al]_0/[M]_0$ molar ratio) (FIG. 10), at various ratios of the respective transition metal complexes, dependent on the nature of the solid support used.

The dual catalyst system of the invention has use in the polymerisation and/or oligomerisation of olefins, particularly α-olefins, for example propene or ethylene, especially ethylene and the co-polymerisation of ethylene with another olefin.

The present invention also provides a process for producing a polymer of an olefin which comprises contacting the olefin with a catalyst system according to the invention, as described above.

In the process, it has been found that the two different types of catalytic metal complexes act cooperatively, i.e. one complex oligomerises olefins while the other complex polymerises the olefin and the in situ formed oligomers. The use of the dual catalyst system of the invention, therefore, makes it possible to synthesize a single copolymer of an olefin while only using a single olefin feed. The process of the invention is particularly suitable for ethylene polymerisation and for ethylene/α-olefin copolymerisation.

Further advantages and features of the subject matter of the present invention can be taken from the following detailed examples section illustrating preferred embodiments in conjunction with the attached drawing, wherein FIG. 1 illustrates productivity results achieved for different catalyst systems according to the present invention; polymerisation of ethylene using LDH/MAO/[complexes] catalysts with a weight ratio zirconium:chromium complex of 75:25 under the condition: 10 mg of catalyst, 2 bar, 1 hour, 60 or 80° C., 150 mg of TIBA, Hexane (50 mL), LDH:MgAl—$CO_3$.

FIG. 2 shows differential scanning calorimetric spectra of polyethylene obtained in the comparative example and according to the present invention; differential scanning calorimetric spectra of polyethylene using bottom, LDH/MAO/$[^{2-Me,4-Ph}SBI)ZrCl_2]$ catalyst and top) LDH/MAO/$[(^{2-Me,4-Ph}SBI)ZrCl_2]:[Pn^*(H)CrCl_2]_2$ 75:25 catalyst under the condition: MgAl—$CO_3$, 10 mg of catalyst, 1 bar, 0.5 hour, 150 mg of TIBA, Hexane (50 mL).

Figure 15:
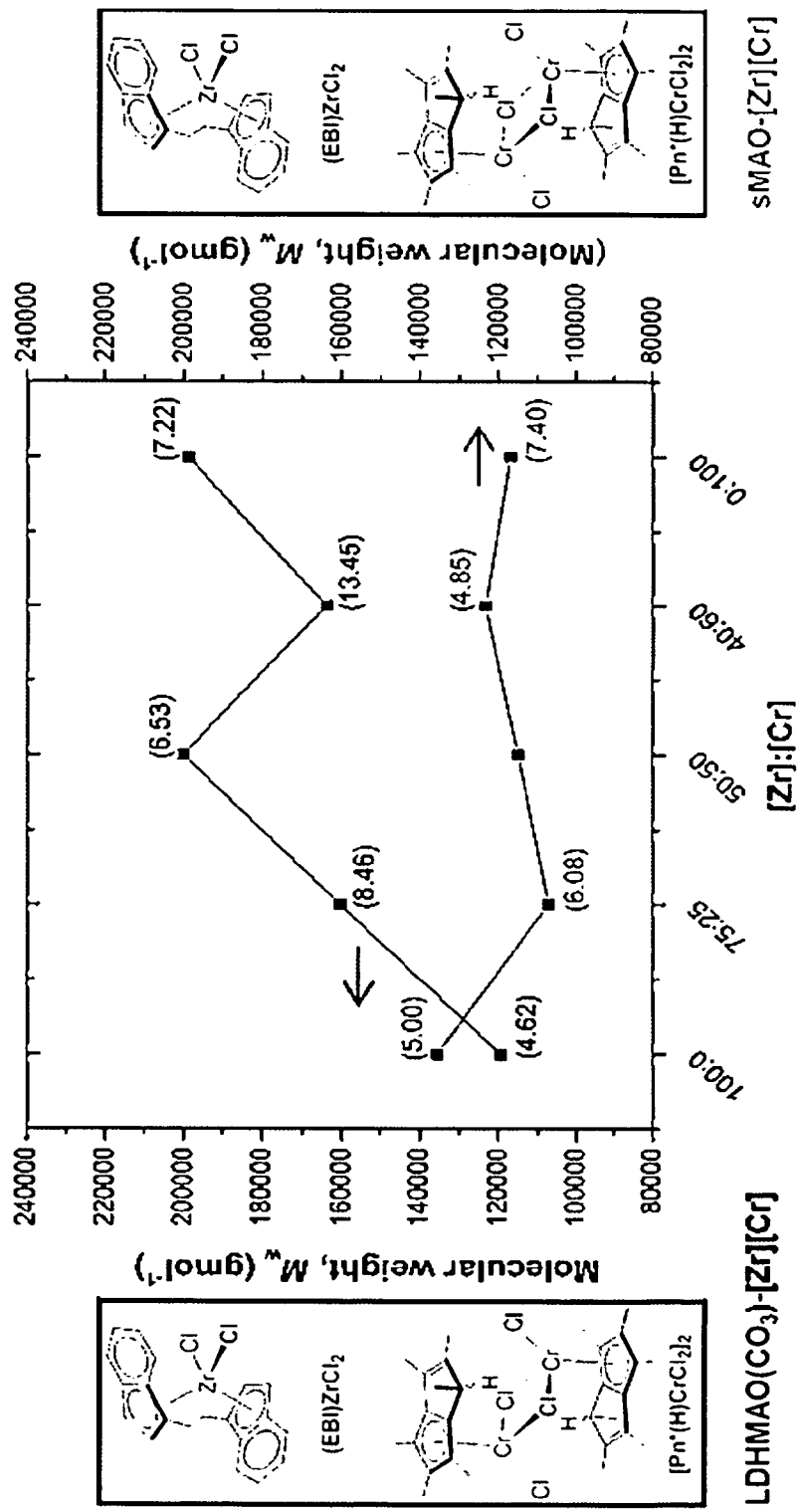

FIG. 15 illustrates molecular weights and distributions recorded by GPC when [Zr]:[Cr] ratio is modified. LDH-MAO or SMAO—[Zr][Cr] catalysts with various molar ratios under the conditions: 10 mg of catalyst, 2 bar, 1 h, 60° C., 150 mg TIBA, Hexane (50 mL). [Al]$_{MAO}$/([Cr]+[M])$_0$=300 for sMAO and 100 for LDHMAO. LDH=AMO—MgAlCO$_3$.

Figure 16:
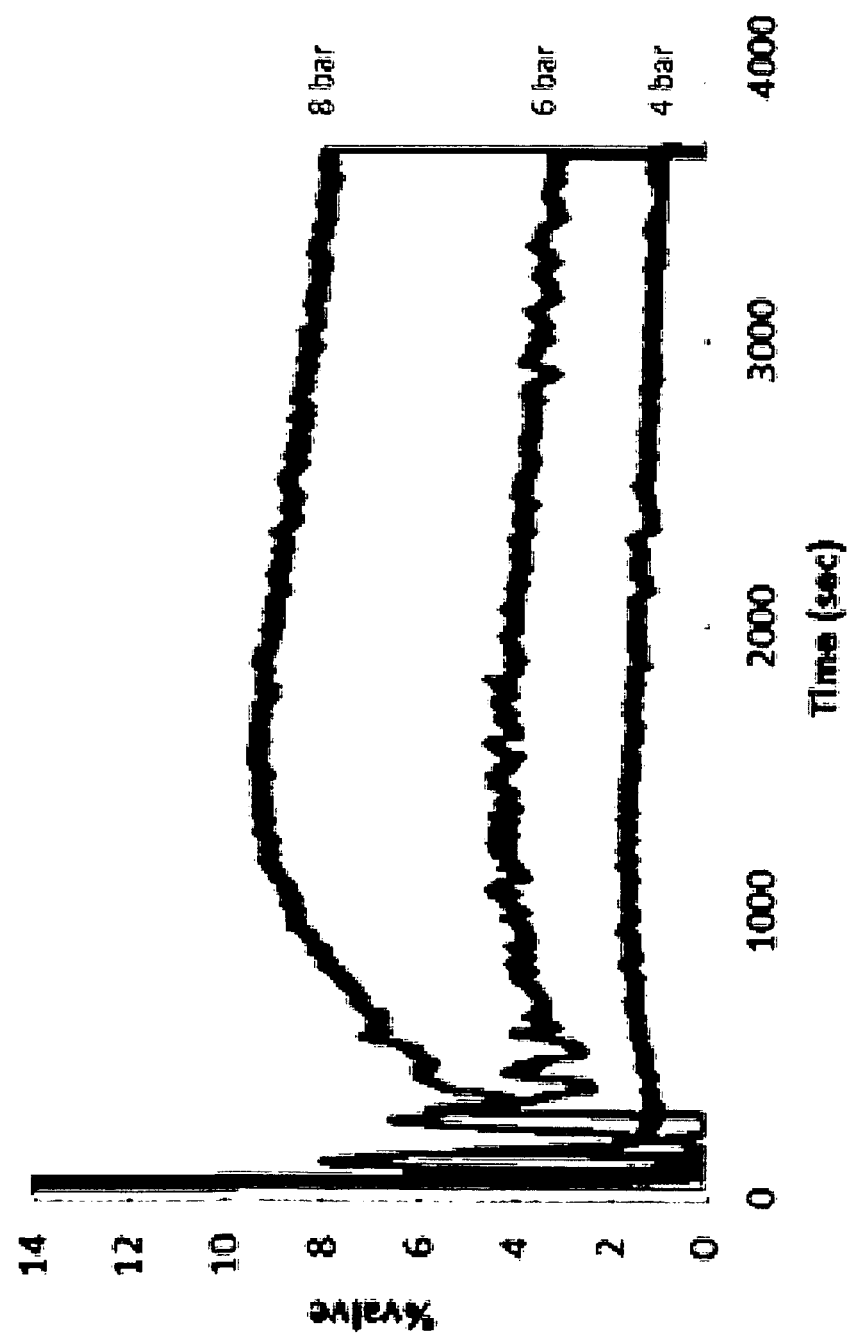

FIG. 16 illustrates a comparison of sMAO—[Zr][Cr] ([Zr]:[Cr]=75:25). 25 mg catalyst, pressure variable (8 bar—blue line, 6 bar—purple line, 4 bar—red line), 1 h, 80° C., [Al]$_{MAO}$/([Cr]+[M])$_0$=300, TEA scavenger.

Figure 17:
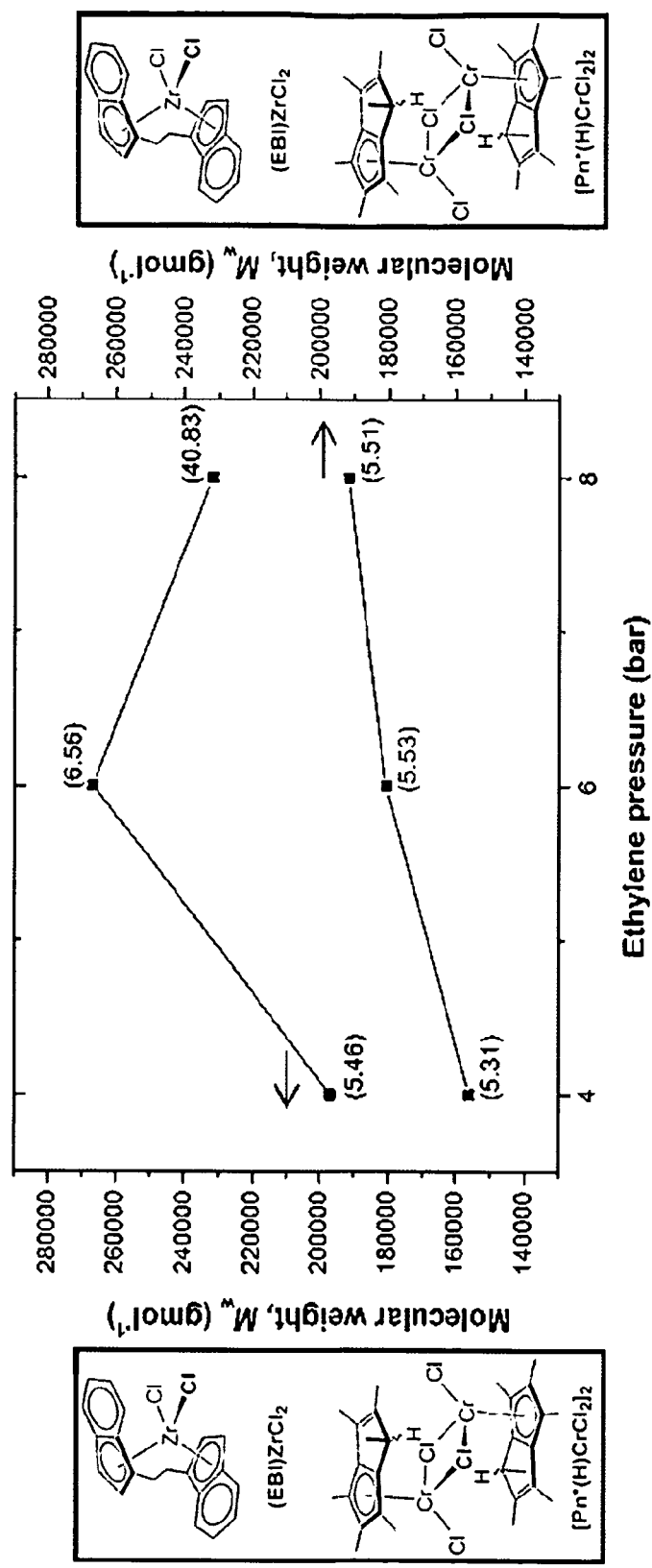

FIG. 17 illustrates a gel permeation chromatography data obtained from polymerisation of ethylene using sMAO—[Zr][Cr] catalyst under the conditions: 1 hour, 80° C., 2.5 mL TEA, Hexane (1 L), [Al]$_{MAO}$/([Cr]+[M])$_0$=300.

Figure 18:
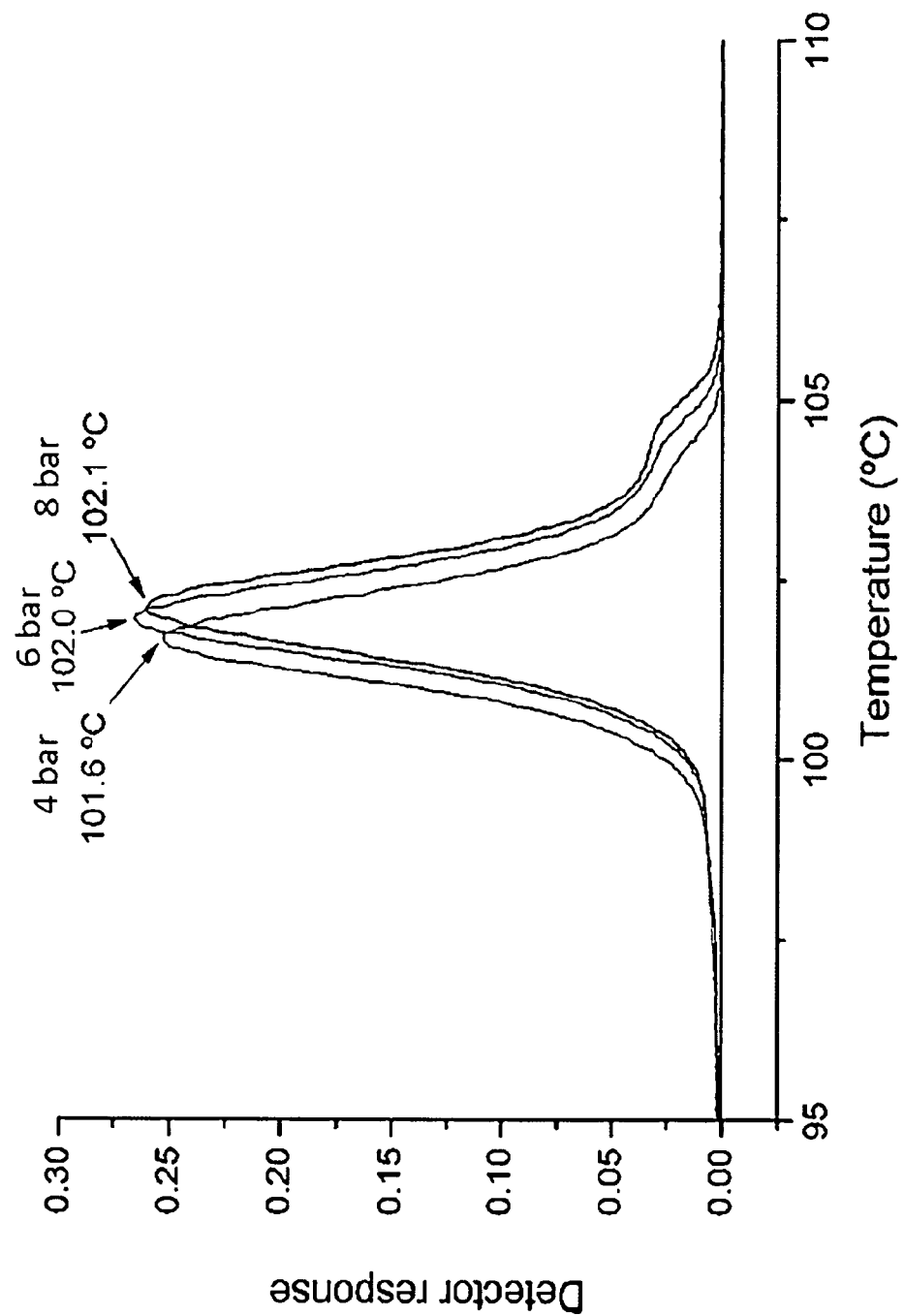

FIG. 18 illustrates a TREF data obtained from polymerisation of ethylene using sMAO—[Zr]$_{60}$[Cr]$_{40}$ catalyst under the conditions: 1 hour, 80° C., 2.5 mL TEA, Hexane (1 L), [Al]$_{MAO}$/([Cr]+[M])$_0$=300.

Figure 19:
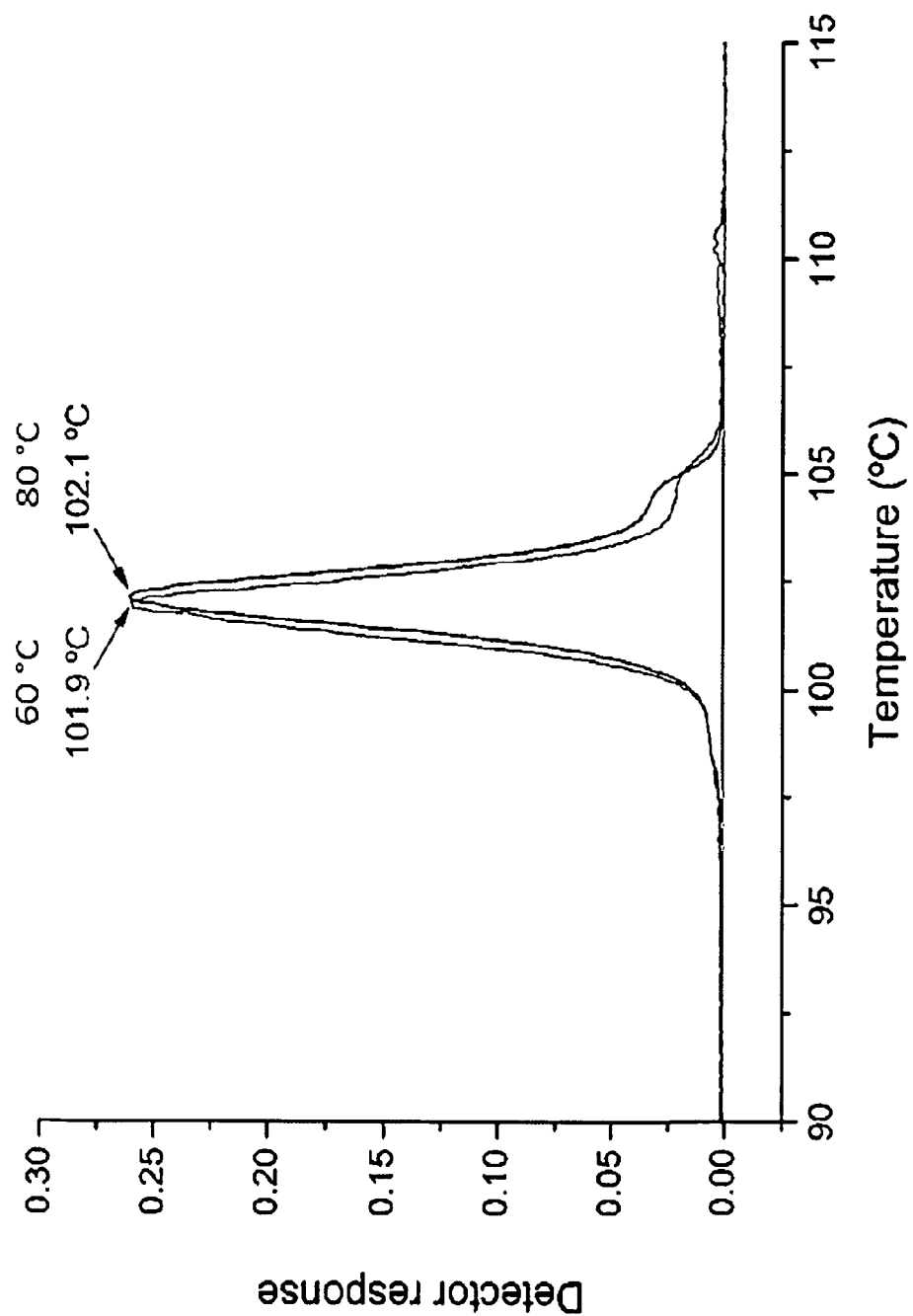

FIG. 19 illustrates a TREF data obtained from polymerisation of ethylene using sMAO—[Zr]$_{60}$[Cr]$_{40}$ catalyst under the conditions: 1 hour, 8 bar, 2.5 mL TEA, Hexane (1 L), [Al]$_{MAO}$/([Cr]+[M])$_0$=300.

Figure 20:
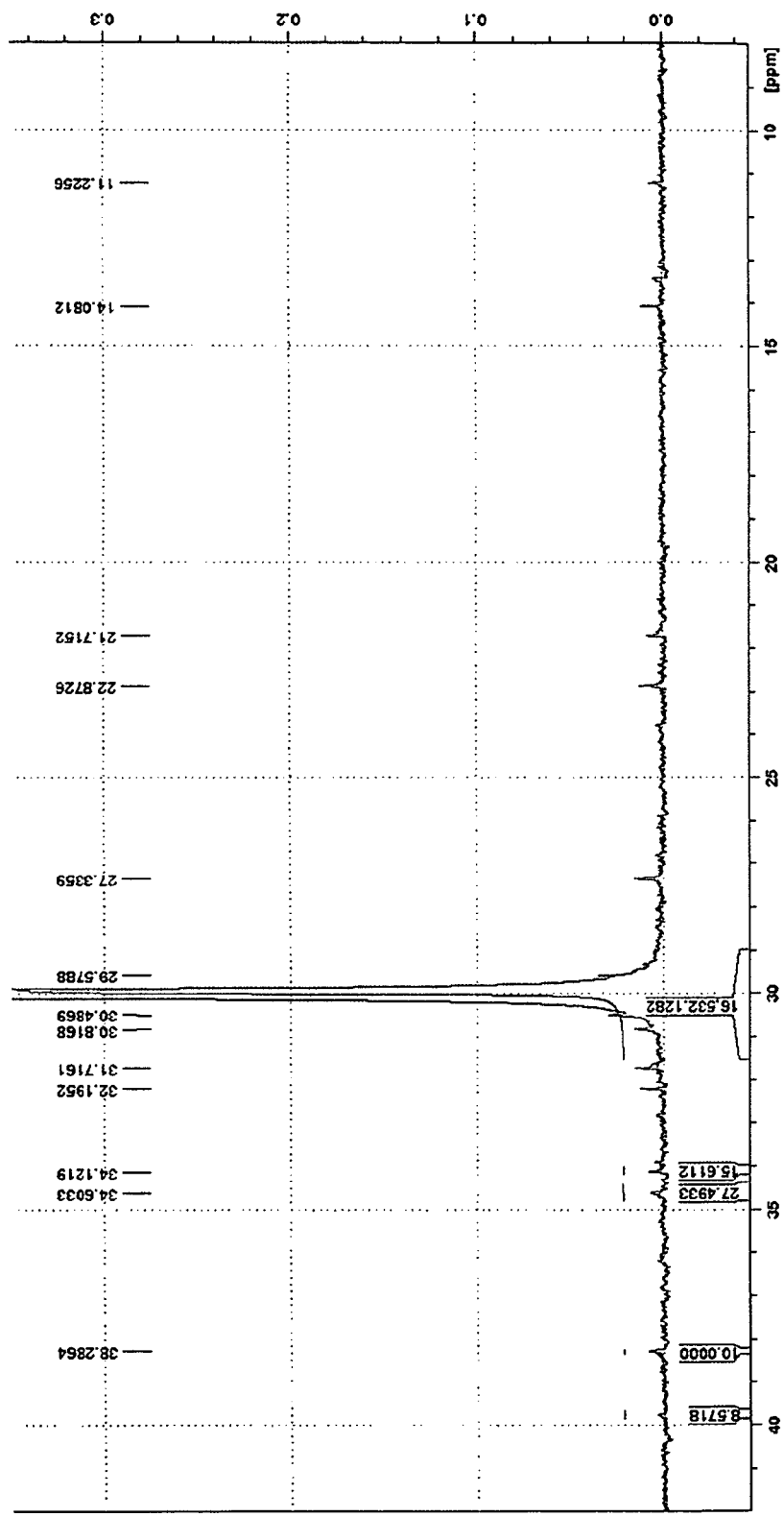

FIG. 20 illustrates a $^{13}$C{$^1$H} NMR spectroscopic data from the polymer produced using sMAO—[Zr]$_{60}$[Cr]$_{40}$ catalyst under the conditions: 1 hour, 8 bar, 80° C., 2.5 mL TEA.

Figure 21:
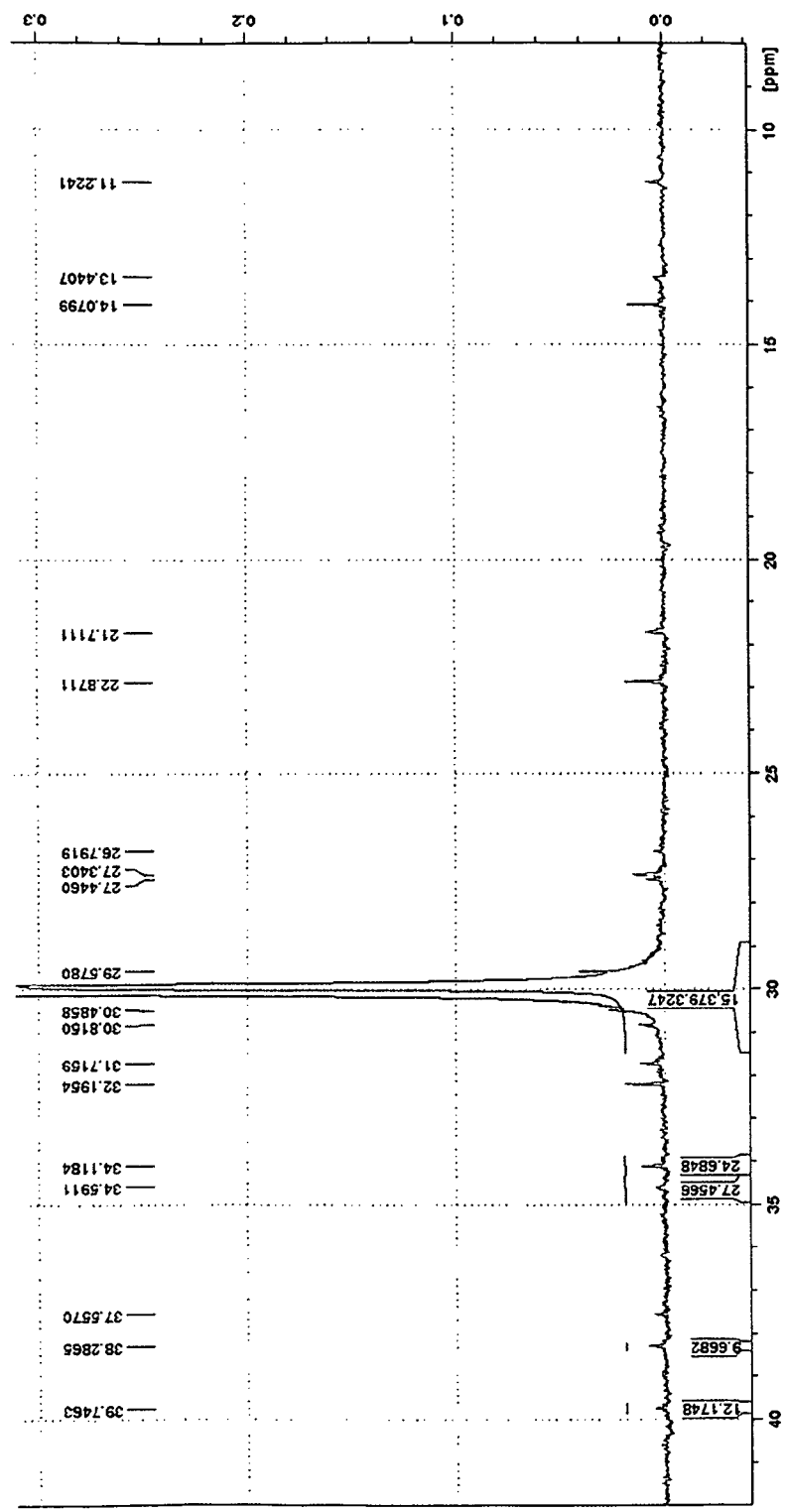

FIG. 21 illustrates a $^{13}$C{$^1$H} NMR spectroscopic data from the polymer produced using sMAO—[Zr]$_{60}$[Cr]$_{40}$ catalyst under the conditions: 1 hour, 4 bar, 80° C., 2.5 mL TEA.

Figure 22:
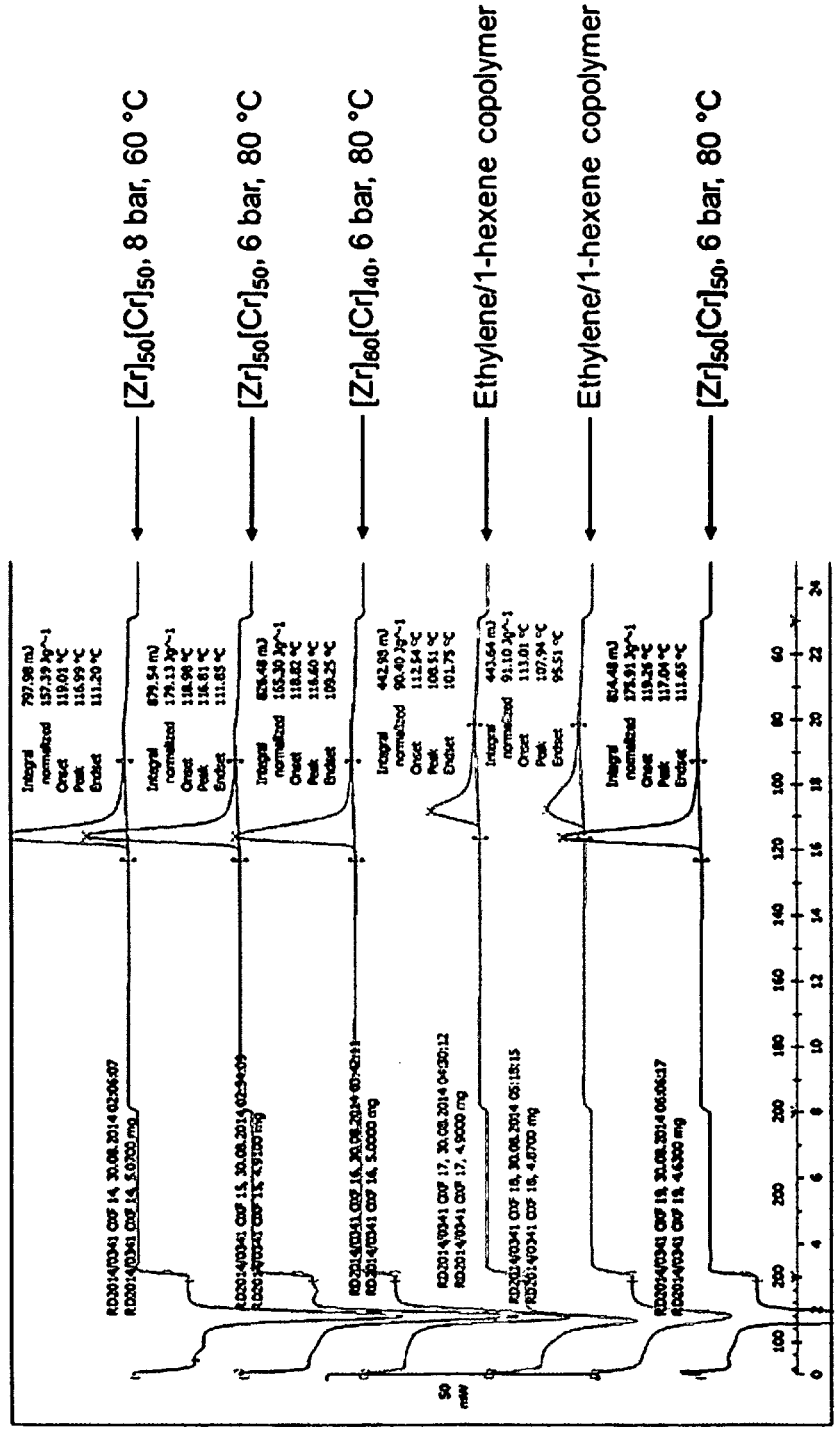

FIG. 22 illustrates a differential scanning calorimetry data from the polymer produced using sMAO catalyst under the general conditions: 1 hour, 2.5 mL TEA.

EXAMPLES

Example 1

1.1 Synthesis of Solid Support Material

Thermally-treated support material (SiO$_2$ (SS) or an acetone-dispersed Layered Double Hydroxide (LDH)) was weighed and slurried in toluene. Methylaluminoxane (MAO), with a solid support:MAO mole ratio of 2:1, was prepared in toluene solution and added to the thermally-treated solid support slurry. The resulting slurry was heated at 80° C. for 2 h with occasional swirling. The product was then filtered, washed with toluene, and dried under dynamic vacuum to afford the final solid support material (LDH-MAO, and SSMAO) in quantitative yield.

Solid MAO (SMAO) was received from SCG Chemicals, dried to afford colourless free-flowing powder and used as is.

The solid support materials used in the examples provided below were MAO treated silica (SSMAO);

MAO treated acetone-dispersed LDH (LDHMAO); and solid MAO (SMAO).

1.2 Synthesis of a Synergistic Dual-catalyst

Solid support material prepared as described above was weighed and slurried in toluene. The solution of at least two complexes (described below) in toluene with support:complexes weight ratio of 0.02 was prepared and added to the support slurry. The resulting slurry was heated at 80° C. for 2 h with occasional swirling or until the solution became colourless. The product was then filtered, washed with toluene and dried under dynamic vacuum to afford the synergistic dual catalyst.

It is also possible to mix the support and at least two complexes in the same Schlenk and then add the toluene. The reaction conditions and work-up are identical as described above.

It is also possible to mix at least both complexes with MAO in a toluene solution and to add them into a slurry of the solid support in toluene. The reaction conditions and work-up are identical as described above.

The first transition metal complex used in the preparation of the dual catalyst system in the Examples was selected from

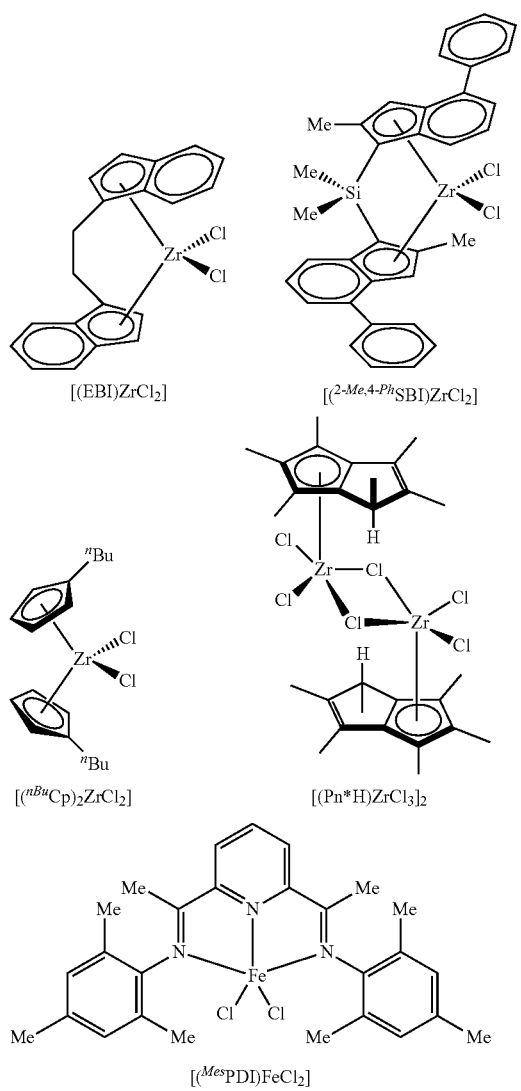

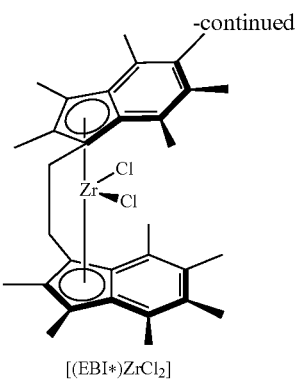

[(EBI*)ZrCl$_2$]

The second transition metal complex used in the preparation of the dual catalyst system was the compound having the formula [Pn*(H)CrCl$_2$]$_2$. This was prepared according to the following synthetic procedure.

(A) Synthesis of (Pn*(H)CrCl$_2$)$_2$

To a slurry of CrCl$_3$ (0.0981 g, 0.619 mmole) in benzene was added a solution of Pn*(H)SnMe$_3$ (0.218 g, 0.619 mmole) in benzene. The reaction mixture was heated to 80° C. for 5 days to afford a dark-green solution. The reaction mixture was filtered and the volatiles were removed in vacuo to afford a dark-green powder which was washed with pentane and dried under reduced pressure to yield [Pn*(H)CrCl$_2$]$_2$ as a dark-green powder. The complex is paramagnetic. The yield was 67%.

(B) Characterisation of [Pn*(H)CrCl$_2$]$_2$

1H NMR spectrum (C$_6$D$_6$:23° C.) δ range is −36.0 to 18.3 ppm.

The polymerisation of ethylene was studied using the dual catalyst systems. To demonstrate the different productivities between the various complexes, a weight ratio of first transition metal catalyst:chromium-hydro(permethylpentalene) complex of 75:25 was chosen.

A. Polymerisation of Ethylene
catalyst: MgAl—CO$_3$ LDH MAO/[complex 1]:[Pn*(H)CrCl$_2$]$_2$
solvent: hexane 50 ml
amount of catalyst: 10 mg
ethylene feed: 200 kPa (2 bar)
reaction time: 1 hour
reaction temperatures: 60° C. and 80° C.
TriIsobutylaluminium (TIBA): 150 mg The results of the polymerisations are shown in Table 1 and FIG. 1.

TABLE 1

| Complex 1 | Complex 2 | Temperature (° C.) | Productivity kg$_{PE}$/g$_{CAT}$/h |
|---|---|---|---|
| [(EBI)ZrCl$_2$] | [Pn*(H)CrCl$_2$]$_2$ | 60 | 0.129 |
| [(EBI)ZrCl$_2$] | [Pn*(H)CrCl$_2$]$_2$ | 80 | 0.205 |
| [(EBI*)ZrCl$_2$] | [Pn*(H)CrCl$_2$]$_2$ | 80 | 0.085 |
| [($^{Mes}$PDI)FeCl$_2$] | [Pn*(H)CrCl$_2$]$_2$ | 60 | 0.545 |
| [($^{Mes}$PDI)FeCl$_2$]LDH | [Pn*(H)CrCl$_2$]$_2$ | 80 | 0.404 |
| [($^{nBu}$Cp)$_2$ZrCl$_2$] | [Pn*(H)CrCl$_2$]$_2$ | 60 | 0.283 |
| [($^{nBu}$Cp)$_2$ZrCl$_2$] | [Pn*(H)CrCl$_2$]$_2$ | 80 | 0.156 |

Figure 1:
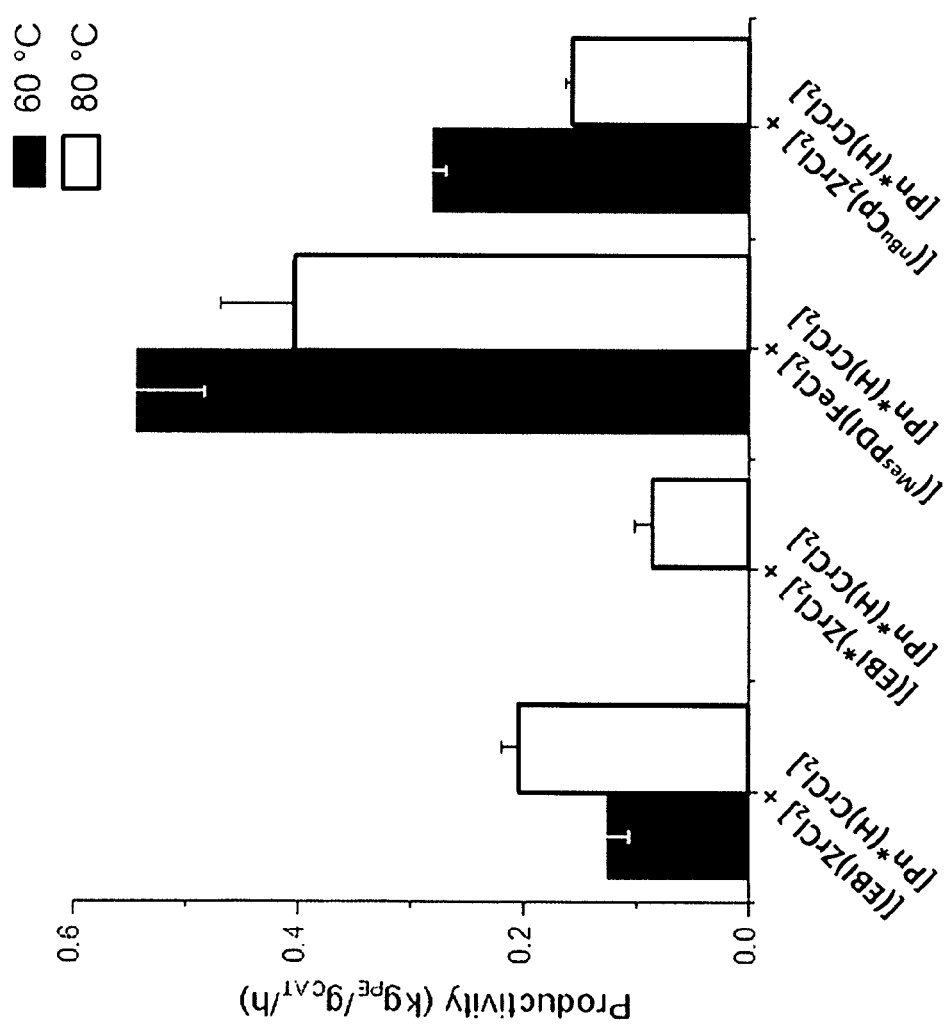

The results shown in Table 1 and FIG. 1 demonstrate that the MgAl—CO$_3$ LDH/[($^{Mes}$PDI)FeCl$_2$] catalyst achieved the highest productivities at 60° C. and 80° C. (0.545 and 0.404 kg$_{PE}$/g$_{CAT}$/h, respectively). The results for the other complexes varied with the temperature. Productivities increased with increases in temperature, with the exception of the [(EBI)ZrCl$_2$] based catalyst.

B. Polymerisation of Ethylene catalyst: MgAl—CO$_3$ LDH MAO/[($^{2-Me,4-Ph}$-SBI)ZrCl$_2$].[Pn*(H)CrCl$_2$]$_2$
solvent: hexane (50 ml)
amount of catalyst: 10 mg
ethylene feed: 200 kPa (2 bar)
reaction time: 0.5 hour
reaction temperature: 80° C.
TIBA: 150 mg The results of the polymerisations are shown in Table 2 below.

TABLE 2

| Complex 1 | Complex 2 | Temperature (° C.) | Aluminium scavenger | Productivity kg$_{PE}$/g$_{CAT}$/h |
|---|---|---|---|---|
| [($^{2-Me,4-Ph}$-SBI)ZrCl$_2$] | [Pn*(H)CrCl$_2$]$_2$ | 80 | TIBA | 0.130 |
| [($^{2-Me,4-Ph}$-SBI)ZrCl$_2$] | [Pn*(H)CrCl$_2$]$_2$ | 80 | MAO | 0.126 |

Ethylene polymerisations using MgAl—CO$_3$ LDH MAO/[($^{2-Me,4-Ph}$SBI)ZrCl$_2$]:[Pn*(H)CrCl$_2$]$_2$ with TIBA or MAO as scavenger demonstrated the same productivities (0.130 and 0.126 kg$_{PE}$/g$_{CAT}$/h respectively).

Figure 2:
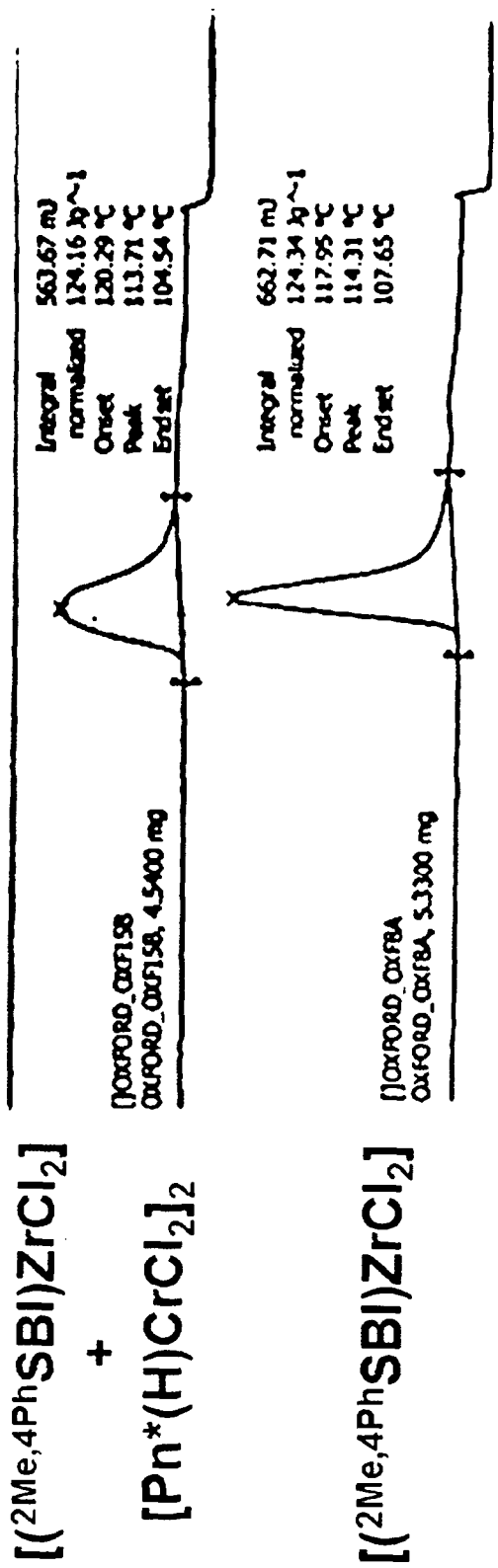

FIG. 2 shows the differential scanning calorimetric spectra of polyethylene using, as catalyst, (1) Top—MgAl—CO$_3$ LDH MAO/[($^{2-Me,4-Ph}$SBI)ZrCl$_2$]:[Pn*(H)CrCl$_2$]$_2$ 75:25
(2) Bottom—MgAl—CO$_3$ LDH MAO/[($^{2-Me,4-Ph}$SBI)ZrCl$_2$]

Conditions employed for (1) and (2):
solvent: hexane (50 ml)
amount of catalyst: 10 mg
ethylene feed: 100 kPa (1 bar)
reaction time: 0.5 hour
TIBA: 150 mg FIG. 2 demonstrates that there is a broadening of the differential scanning calorimetric spectra when the dual catalyst system was used in comparison with the single catalyst system.

Figure 3:
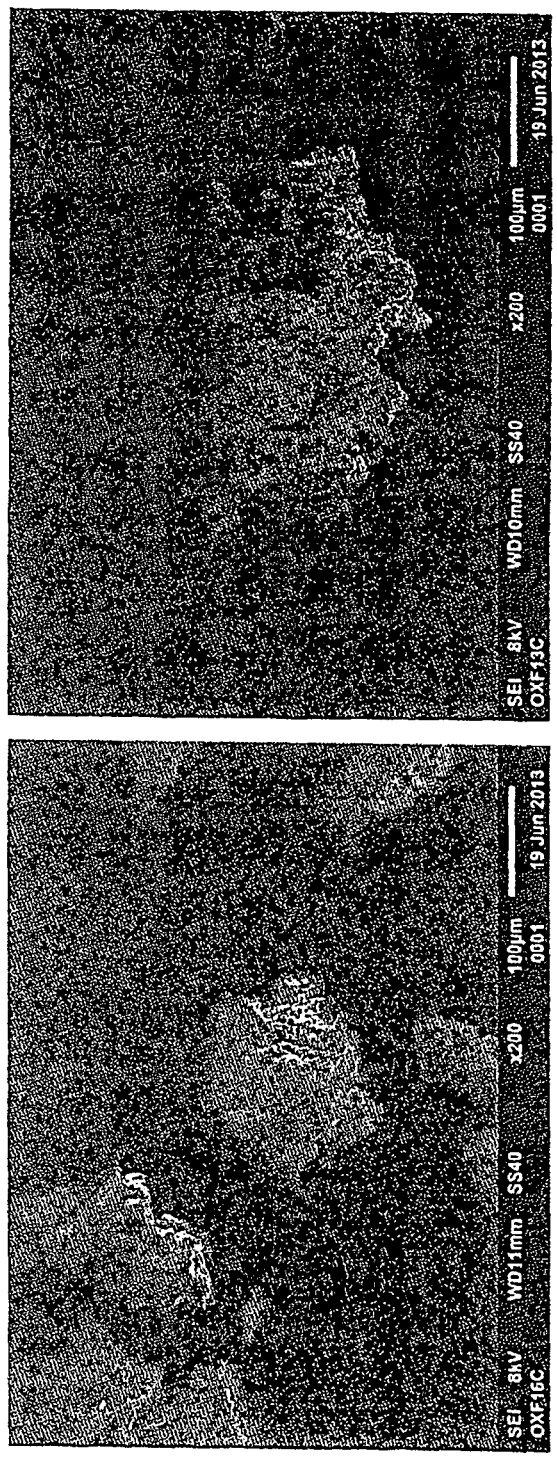
FIG. 3 illustrates SEM images of polyethylene using a) LDH/MAO/[$(^{2-Me,4-Ph}$SBI)ZrCl$_2$] catalyst and b) LDH/MAO/[$(^{2-Me,4-Ph}$SBI)ZrCl$_2$]:[Pn*(H)CrCl$_2$]$_2$ 75:25 catalyst under the condition: MgAl—CO$_3$, 10 mg of catalyst, 1 bar, 0.5 hour, 150 mg of TIBA, Hexane (50 mL).

This broadening is characteristic of ethylene/α-olefin co-polymerisations. The polymerisation was, however, carried out using only a single ethylene feed. The scanning electron microscope image in FIG. 3 demonstrates the flower type particles of the polyethylene, this is similar to the LDH starting material.

C. When the polymerisations were carried out in a 2 L reactor (1000 mL of hexane, 1 h, 80° C. and 8 bar) the productivity using MgAl—CO$_3$ LDM MAO/[($^{2-Me,4-Ph}$SBI)ZrCl$_2$]:[Pn*(H)CrCl$_2$]$_2$ 75:25 was 0.55 kg$_{PE}$/g$_{CAT}$/h, 4 times higher than when 50 mL of solvent is used. The polyethylene possessed very large particle size (70% of 500 μm, 17% of 250 μm and other smaller ones), comparing to those obtained when MgAl—CO$_3$ LDH MAO/[($^{2-Me,4-Ph}$SBI)ZrCl$_2$] was used as a catalyst (58% of 500 μm, 23% of 250 μm and other smaller ones).

The molecular weights were similar, 531505 g/mol for MgAl—CO$_3$ LDH MAO/[($^{2-Me,4-Ph}$SBI)ZrCl$_2$]:[Pn*(H)CrCl$_2$]$_2$ and 567861 g/mol for MgAl—CO$_3$ LDH MAO/[($^{2-Me,4-Ph}$SBI)ZrCl$_2$]. However, there is an increase of 3 fold in the bulk CH$_3$ per 1000 C from 0.665 for MgAl—CO$_3$ LDH MAO/[($^{2-Me,4-Ph}$SBI)ZrCl$_2$] to 1.429 for MgAl—CO$_3$ LDH MAO/[($^{2-Me,4-Ph}$SBI)ZrCl$_2$]:[Pn*(H)CrCl$_2$]$_2$.

The molecular weights are weight average molecular weight (M$_W$) and were determined by Gel Permeation Chromatography (GPC).

D. Variation of the Weight Ratio Using LDHMAO

Figure 4:
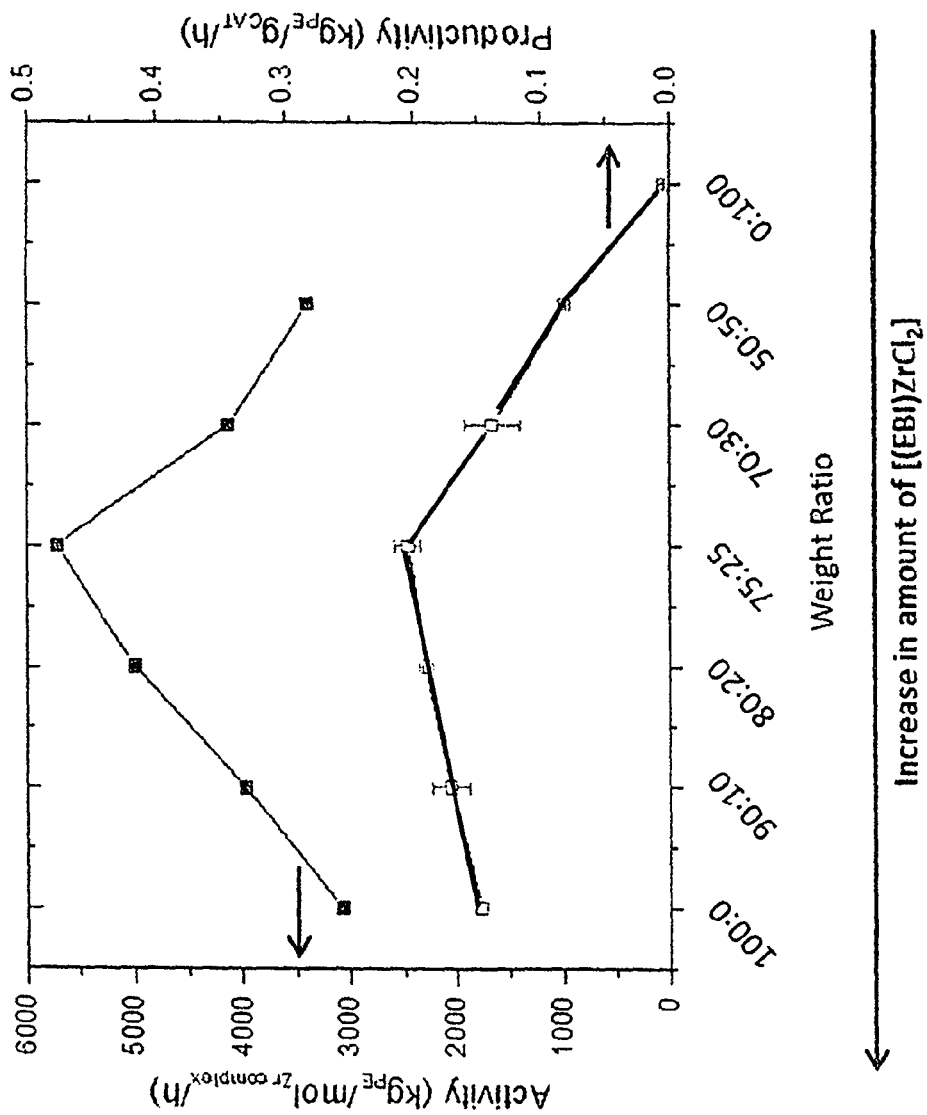
FIG. 4 illustrates the dependency of weight ratio of first and second transition metal catalyst on activity and productivity; polymerisation of ethylene using LDH/MAO/[(EBI)ZrCl$_2$]:[Pn*(H)CrCl$_2$]$_2$ catalysts with a various weight ratio under the condition: 10 mg of catalyst, 2 bar, 1 hour, 80° C., 150 mg of TIBA, Hexane (50 mL), LDH:MgAl—CO$_3$.
Figure 5:
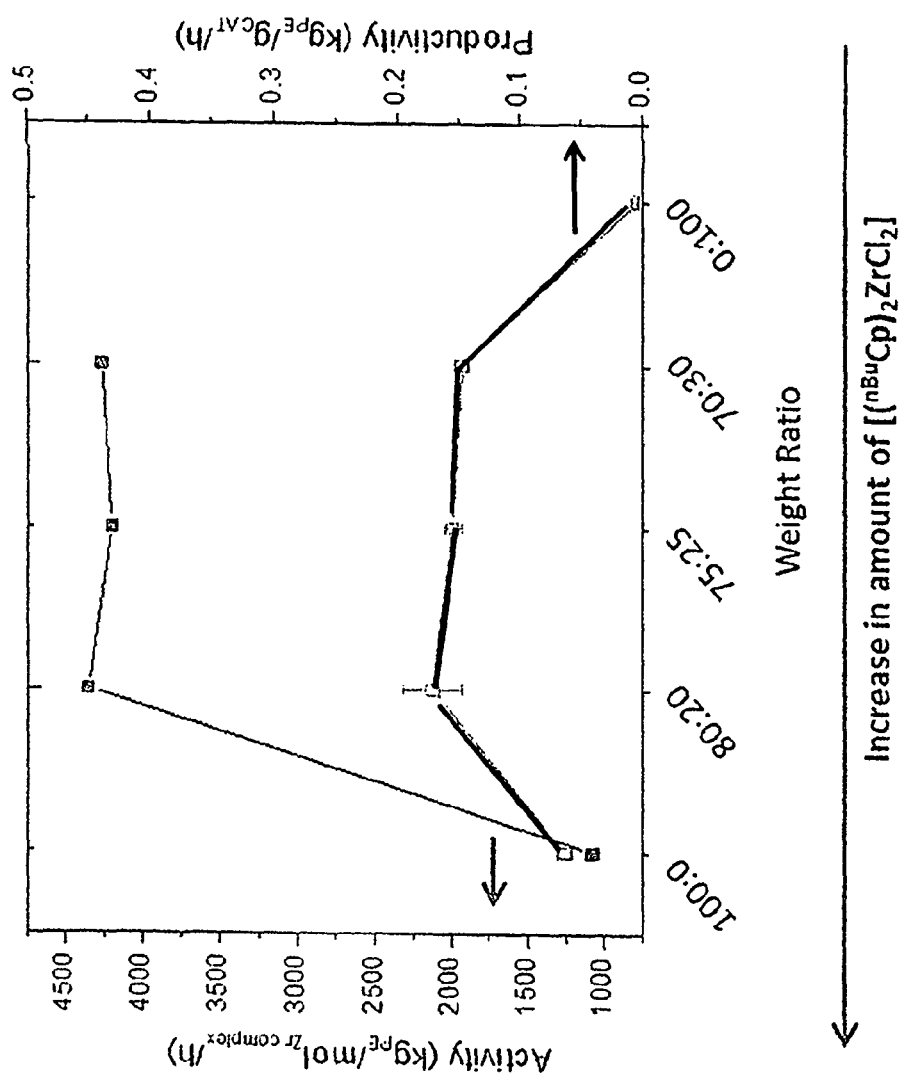
FIG. 5 illustrates the dependency of weight ratio of first and second transition metal catalyst on activity and productivity; polymerisation of ethylene using LDH/MAO/[($^{nBu}$Cp)$_2$ZrCl$_2$]:[Pn*(H)CrCl$_2$]$_2$ catalysts with a various weight ratio under the condition: 10 mg of catalyst, 2 bar, 1 hour, 80° C., 150 mg of TIBA, Hexane (50 mL), LDH:MgAl—CO$_3$.

To try to understand the effect the weight ratio of zirconium:chromium in the dual catalyst system has on the activities, several different weight ratios were chosen and the results are collated in Tables 3 and 4, and FIGS. 4 and 5.

TABLE 3

Polymerisation of ethylene using MgAl—CO$_3$ LDH MAO/[(EBI)ZrCl$_2$]:[Pn*(H)CrCl$_2$]$_2$ catalyst under the condition: 10 mg of catalyst, 2 bar, 1 hour, 80° C., 150 mg of TIBA, Hexane (50 ml).

| Complex 1 | Complex 2 | Weight Ratio | Productivity kg$_{PE}$/g$_{CAT}$/h | Activity kg$_{PE}$/mol$_{Zr\ complex}$/h |
|---|---|---|---|---|
| [(EBI)ZrCl$_2$] | [Pn*(H)CrCl$_2$]$_2$ | 100:00 | 0.147 | 3076 |
| [(EBI)ZrCl$_2$] | [Pn*(H)CrCl$_2$]$_2$ | 90:10 | 0.171 | 3976 |
| [(EBI)ZrCl$_2$] | [Pn*(H)CrCl$_2$]$_2$ | 80:20 | 0.191 | 4996 |
| [(EBI)ZrCl$_2$] | [Pn*(H)CrCl$_2$]$_2$ | 75:25 | 0.205 | 5720 |
| [(EBI)ZrCl$_2$] | [Pn*(H)CrCl$_2$]$_2$ | 70:30 | 0.138 | 4124 |
| [(EBI)ZrCl$_2$] | [Pn*(H)CrCl$_2$]$_2$ | 50:50 | 0.081 | 3389 |
| [(EBI)ZrCl$_2$] | none | 0:100 | 0.003 | negligible |

Figure 6:
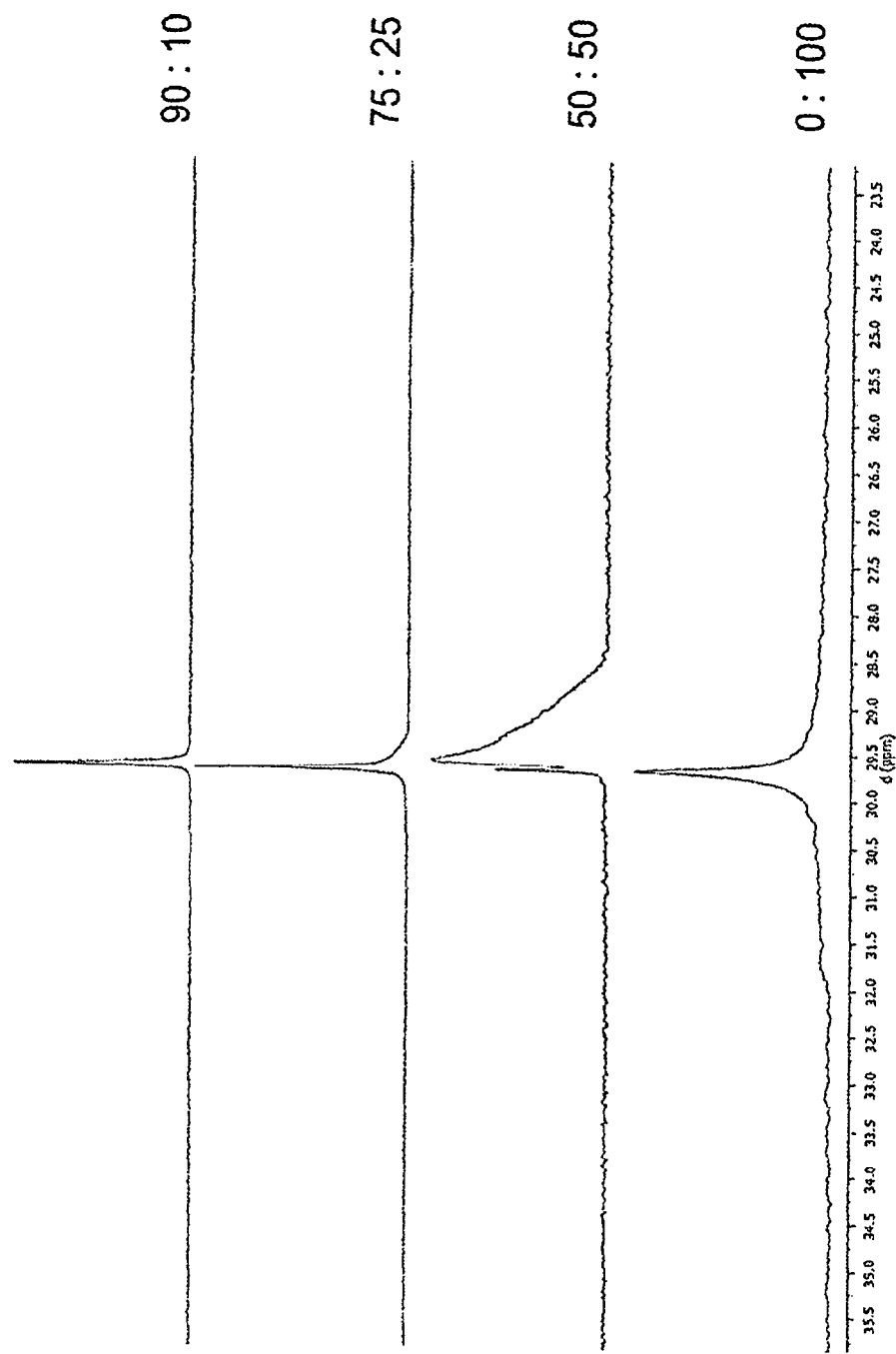
FIG. 6 illustrates $^{13}$CNMR spectra for a polyethylene obtained with a catalyst of the present invention; $^{13}$C{$^1$H} NMR spectra in CD$_4$Cl$_2$ at 383 K of polyethylene synthesised using LDH/MAO/[(EBI)ZrCl$_2$]:[Pn*(H)CrCl$_2$]$_2$ catalysts with a various weight ratio under the condition: 10 mg of catalyst, 2 bar, 1 hour, 80° C., 150 mg of TIBA, Hexane (50 mL), LDH:MgAl—CO$_3$.
Figure 7:
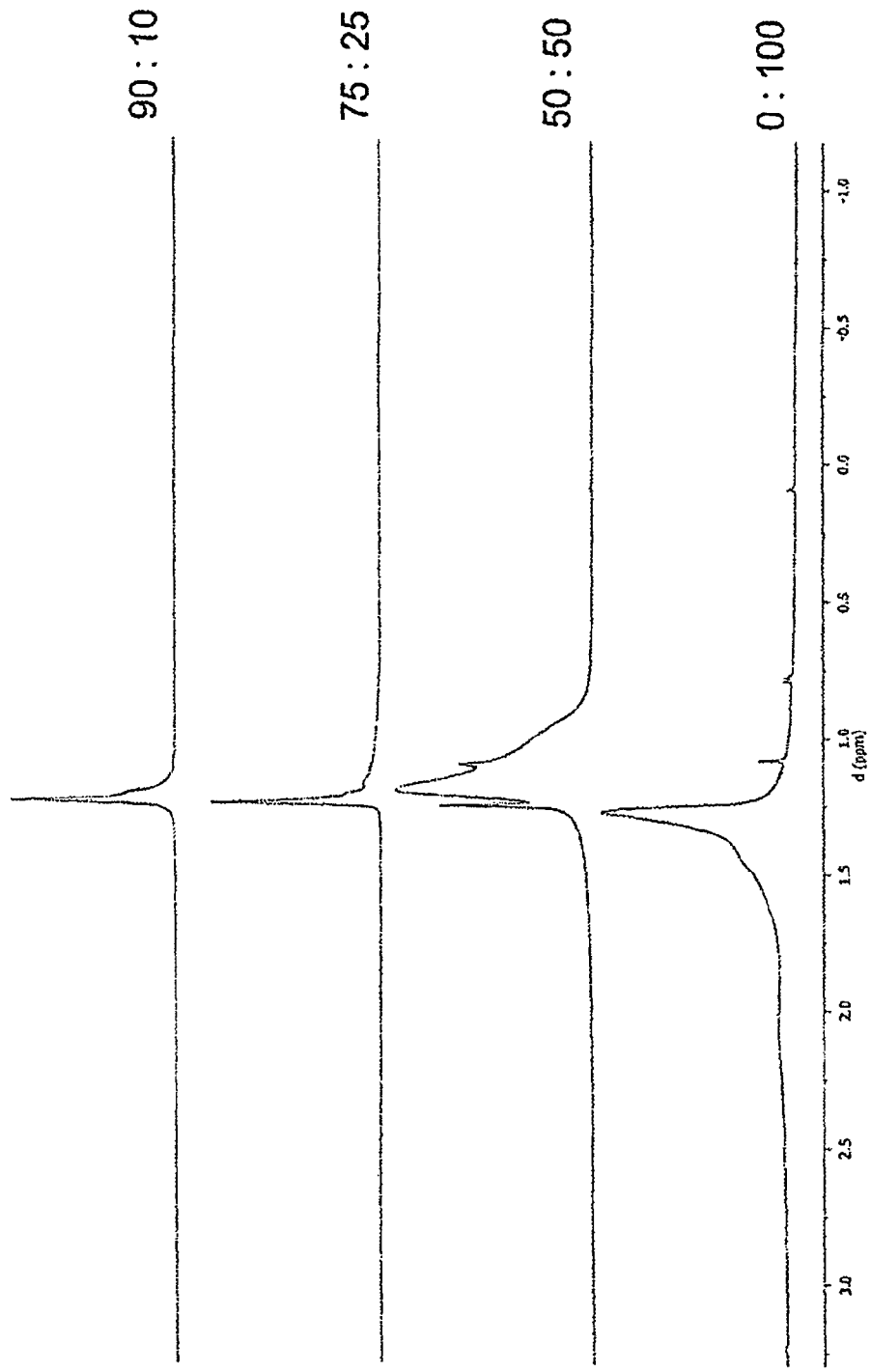
FIG. 7 illustrates a $^1$H NMR spectra for a polyethylene obtained by catalyst system according to the present invention; $^1$H NMR spectra in CD$_4$Cl$_2$ at 383 K of polyethylene synthesised using LDH/MAO/[(EBI)ZrCl$_2$]:[Pn*(H)CrCl$_2$]$_2$ catalysts with a various weight ratio under the condition: 10 mg of catalyst, 2 bar, 1 hour, 80° C., 150 mg of TIBA, Hexane (50 mL), LDH: MgAl—CO$_3$.

Table 3 and FIG. 4 show that when using MgAl—CO$_3$ LDH MAO/[(EBI)ZrCl$_2$]:[Pn*(H)CrCl$_2$]$_2$, the weight ratio of 75:25 provided the highest activity (5720 kg$_{PE}$/mol$_{Zr\ complex}$/h). Adding the [Pn*(H)CrCl$_2$]$_2$ complex demonstrated a direct effect on the activities with 25% in weight increased them by 2 fold factor in comparison of the catalyst based on pure [(EBI)ZrCl$_2$]. The morphology of the polymers changed with the ratio of LDH MAO/[(EBI)ZrCl$_2$]:[Pn*(H)CrCl$_2$]$_2$ as shown in FIGS. 6 and 7. The Figures show that there is a broadening of the NMR spectra with an increase in chromium. This demonstrates the presence of branching in the polymer.

TABLE 4

Polymerisation of ethylene using MgAl—CO$_3$ LDH MAO/
[($^{nBu}$Cp)$_2$ZrCl$_2$]:[Pn*(H)CrCl$_2$]$_2$ catalyst under the condition: 10 mg
of catalyst, 2 bar, 1 hour, 80° C., 150 mg of TIBA, Hexane (50 ml).

| Complex 1 | Complex 2 | Weight Ratio | Productivity kg$_{PE}$/g$_{CAT}$/h | Activity kg$_{PE}$/mol$_{Zr\ complex}$/h |
|---|---|---|---|---|
| [($^{nBu}$Cp)$_2$ZrCl$_2$] | none | 100:00 | 0.063 | 1079 |
| [($^{nBu}$Cp)$_2$ZrCl$_2$] | [Pn*(H)CrCl$_2$]$_2$ | 80:20 | 0.171 | 4345 |
| [($^{nBu}$Cp)$_2$ZrCl$_2$] | [Pn*(H)CrCl$_2$]$_2$ | 75:25 | 0.155 | 4194 |
| [($^{nBu}$Cp)$_2$ZrCl$_2$] | [Pn*(H)CrCl$_2$]$_2$ | 70:30 | 0.148 | 4262 |
| none | [Pn*(H)CrCl$_2$]$_2$ | 0:100 | 0.003 | negligible |

Table 4 and FIG. 5 show that when using LDH MAO/[($^{nBu}$Cp)$_2$ZrCl$_2$]:[Pn*(H) CrCl$_2$]$_2$, the weight ratio of 80:20 provided the highest activity and productivity (4345 kg$_{PE}$/mol$_{Zrcomplex}$/h and 0.171 kg$_{PE}$/g$_{CAT}$/h respectively). Adding the [Pn*(H)CrCl$_2$]$_2$ complex demonstrated a direct effect on the activities with an increase by 4 fold factor in comparison of the catalyst based on pure [($^{nBu}$Cp)$_2$ZrCl$_2$]. The activities remain constant with addition of more [Pn*(H)CrCl$_2$]$_2$; however, the productivities decrease.

Similar polymerisations have been carried out using a zirconium complex based on permethylpentalene ligand [Pn*(H)ZrCl$_3$]$_2$.

TABLE 5

Polymerisation of ethylene using MgAl—CO$_3$ LDH/MAO/
[Pn*(H)ZrCl$_3$]$_2$:[Pn*(H)CrCl$_2$]$_2$ catalyst under the condition: 10 mg
of catalyst, 2 bar, 1 hour, 80° C., 150 mg of TIBA, Hexane (50 ml).

| Complex 1 | Complex 2 | Weight Ratio | Productivity kg$_{PE}$/g$_{CAT}$/h | Activity kg$_{PE}$/mol$_{Zr\ complex}$/h |
|---|---|---|---|---|
| [Pn*(H)ZrCl$_3$]$_2$ | none | 100:0 | 0.0055 | 192 |
| [Pn*(H)ZrCl$_3$]$_2$ | [Pn*(H)CrCl$_2$]$_2$ | 75:25 | 0.0072 | 335 |

Activity increases by 75% when the chromium complex was incorporated (335 kg$_{PE}$/mol$_{Zr\ complex}$/h instead of 192 kg$_{PE}$/mol$_{Zr\ complex}$/h).

E. Variation of the Solid Support

To understand the effect of the support on the productivity, three supports have been tested (MgAl—CO$_3$ LDH-MAO, SSMAO and SMAO). The results are collated in Table 6.

TABLE 6

Polymerisation of ethylene using support/[(EBI)ZrCl$_2$]:[Pn*(H)CrCl$_2$]$_2$ catalyst under the
condition: 10 mg of catalyst, 2 bar, 1 hour, 80° C., 150 mg of TIBA, Hexane (50 ml).

| Complex 1 | Complex 2 | Weight Ratio | Support | Productivity kg$_{PE}$/g$_{CAT}$/h | Activity kg$_{PE}$/mol$_{Zrcomplex}$/h |
|---|---|---|---|---|---|
| [(EBI)ZrCl$_2$] | [Pn*(H)CrCl$_2$]$_2$ | 75:25 | LDHMAO | 0.205 | 5720 |
| [(EBI)ZrCl$_2$] | [Pn*(H)CrCl$_2$]$_2$ | 75:25 | SSMAO | 0.167 | 4660 |
| [(EBI)ZrCl$_2$] | [Pn*(H)CrCl$_2$]$_2$ | 75:25 | SMAO | 0.785 | 21900 |

LDHMAO = acetone-dispersed MgAl—CO$_3$ LDH treated with MAO;
SSMAO = calcined SiO$_2$ treated with MAO;
SMAO = solid methylaluminoxane Solid MAO (SMAO) (21900 kg$_{PE}$/mol$_{Zr\ complex}$/h) is four to five times faster than LDHMAO (5720 kg$_{PE}$/mol$_{Zr\ complex}$/h) and SSMAO (4660 kg$_{PE}$/mol$_{Zrcomplex}$/h) respectively.

F. Variation of [Al]$_0$/[M]$_0$ on Solid MAO

To understand the effect of the amount of complex on the support on the productivity, two amounts have been tested. The results are collated in Table 7.

TABLE 7

Polymerisation of ethylene using MgAl—$CO_3$ LDH MAO/
[(EBI)$ZrCl_2$]:[Pn*(H)$CrCl_2$]$_2$ catalyst under the condition: 10 mg
of catalyst, 2 bar, 1 hour, 80° C., 150 mg of TIBA, Hexane (50 ml).

| Complex 1 | Complex 2 | Weight Ratio | $[Al]_0/[M]_0$ | Productivity $kg_{PE}/g_{CAT}/h$ | Activity $kg_{PE}/mol_{Zrcomplex}/h$ |
|---|---|---|---|---|---|
| [(EBI)$ZrCl_2$] | [Pn*(H)$CrCl_2$]$_2$ | 75:25 | 300 | 0.785 | 21902 |
| [(EBI)$ZrCl_2$] | [Pn*(H)$CrCl_2$]$_2$ | 75:25 | 100 | 0.699 | 6078 |

Solid MAO with a ratio $[Al]_0/[M]_0$ of 300 (21900 $kg_{PE}/mol_{Zr\ complex}/h$) is 3.5 times faster than with a ratio $[Al]_0/[M]_0$ of 100 (6078 $kg_{PE}/mol_{Zr\ complex}/h$).

G. Variation of Molar Ratio of [Transition Metal 1]/[Transition Metal 2] Using LDHMAO To try to understand the effect the molar ratio of transition metal 1/transition metal 2 has on activity, the relative ratio was varied, whilst maintaining a total $[Al]_0/[M]_0$ of 100. The results are collated in Table 8 and FIG. 8.

TABLE 8

Polymerisation of ethylene using support/
[(EBI)$ZrCl_2$]:[Pn*(H)$CrCl_2$]$_2$ catalyst under the
condition: 10 mg of catalyst, 2 bar ethylene,
1 hour, 60° C., 150 mg of TIBA, Hexane (50 mL).

| Complex 1 | Complex 2 | Molar Ratio (Complex 1:Complex 2) | Activity $kg_{PE}/mol_{Zrcomplex}/h$ |
|---|---|---|---|
| [(EBI)$ZrCl_2$] | [Pn*(H)$CrCl_2$]$_2$ | 100:0 | 2381 |
| [(EBI)$ZrCl_2$] | [Pn*(H)$CrCl_2$]$_2$ | 75:25 | 3860 |
| [(EBI)$ZrCl_2$] | [Pn*(H)$CrCl_2$]$_2$ | 50:50 | 3718 |
| [(EBI)$ZrCl_2$] | [Pn*(H)$CrCl_2$]$_2$ | 40:60 | 2669 |
| [(EBI)$ZrCl_2$] | [Pn*(H)$CrCl_2$]$_2$ | 0:100 | negligible |

LDHMAO = acetone-dispersed MgAl—$CO_3$ LDH treated with MAO

Figure 8:
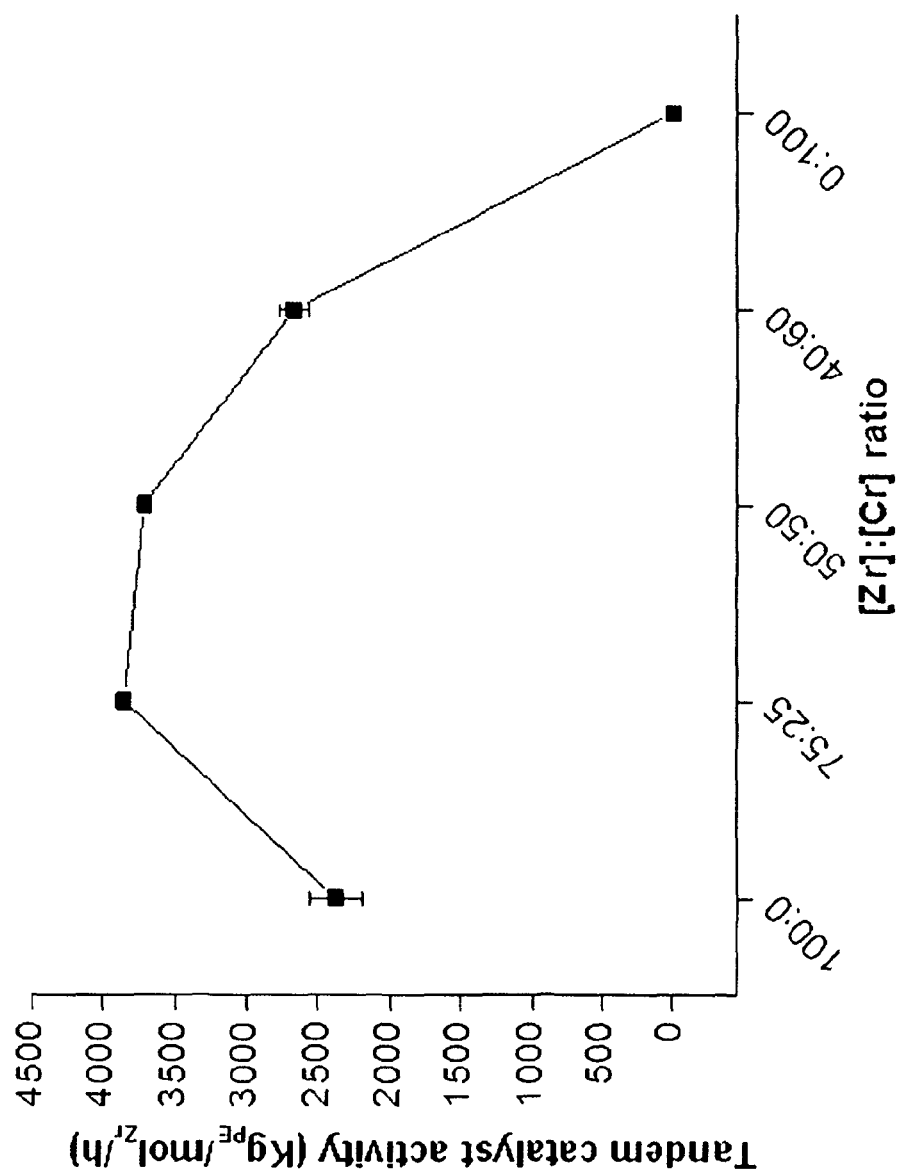
FIG. 8 illustrates the dependency of molar ratio of first and second transition metal catalyst on activity; polymerisation of ethylene using LDH/MAO/[(EBI)ZrCl$_2$]:[Pn*(H)CrCl$_2$]$_2$ catalysts with various molar ratios under the condition: 10 mg of catalyst, 2 bar, 1 hour, 60° C., 150 mg of TIBA, Hexane (50 mL), LDH: MgAl—CO$_3$.

Table 8 and FIG. 8 show that when using LDHMAO/[(EBI)$ZrCl_2$]:[Pn*(H)$CrCl_2$]$_2$, the molar ratio of 75:25 provided the highest activity (3860 $kg_{PE}/mol_{Zrcomplex}/h$). All system compositions that include [Pn*(H)$CrCl_2$]$_2$ demonstrate a higher activity than the 100:0 molar ratio. Negligible activity was observed when the molar ratio was 0:100 (i.e. no [(EBI)$ZrCl_2$] was present).

H. Variation of Molar Ratio of [Transition Metal 1]/[Transition Metal 2] Using SMAO To try to understand the effect the molar ratio of transition metal 1/transition metal 2 has on activity, the relative ratio was varied, whilst maintaining a total $[Al]_0/[M]_0$ of 300. The results are collated in Table 9 and FIG. 9.

TABLE 9

Polymerisation of ethylene using support/
[(EBI)$ZrCl_2$]:[Pn*(H)$CrCl_2$]$_2$ catalyst under the
condition: 10 mg of catalyst, 2 bar ethylene,
1 hour, 60° C., 150 mg of TIBA, Hexane (50 mL).

| Complex 1 | Complex 2 | Molar Ratio (Complex 1:Complex 2) | Activity $kg_{PE}/mol_{Zrcomplex}/h$ |
|---|---|---|---|
| [(EBI)$ZrCl_2$] | [Pn*(H)$CrCl_2$]$_2$ | 100:0 | 15459 |
| [(EBI)$ZrCl_2$] | [Pn*(H)$CrCl_2$]$_2$ | 75:25 | 17482 |
| [(EBI)$ZrCl_2$] | [Pn*(H)$CrCl_2$]$_2$ | 60:40 | 23784 |
| [(EBI)$ZrCl_2$] | [Pn*(H)$CrCl_2$]$_2$ | 50:50 | 20687 |
| [(EBI)$ZrCl_2$] | [Pn*(H)$CrCl_2$]$_2$ | 40:60 | 19466 |
| [(EBI)$ZrCl_2$] | [Pn*(H)$CrCl_2$]$_2$ | 0:100 | negligible |

SMAO = solid methylaluminoxane

Figure 9:
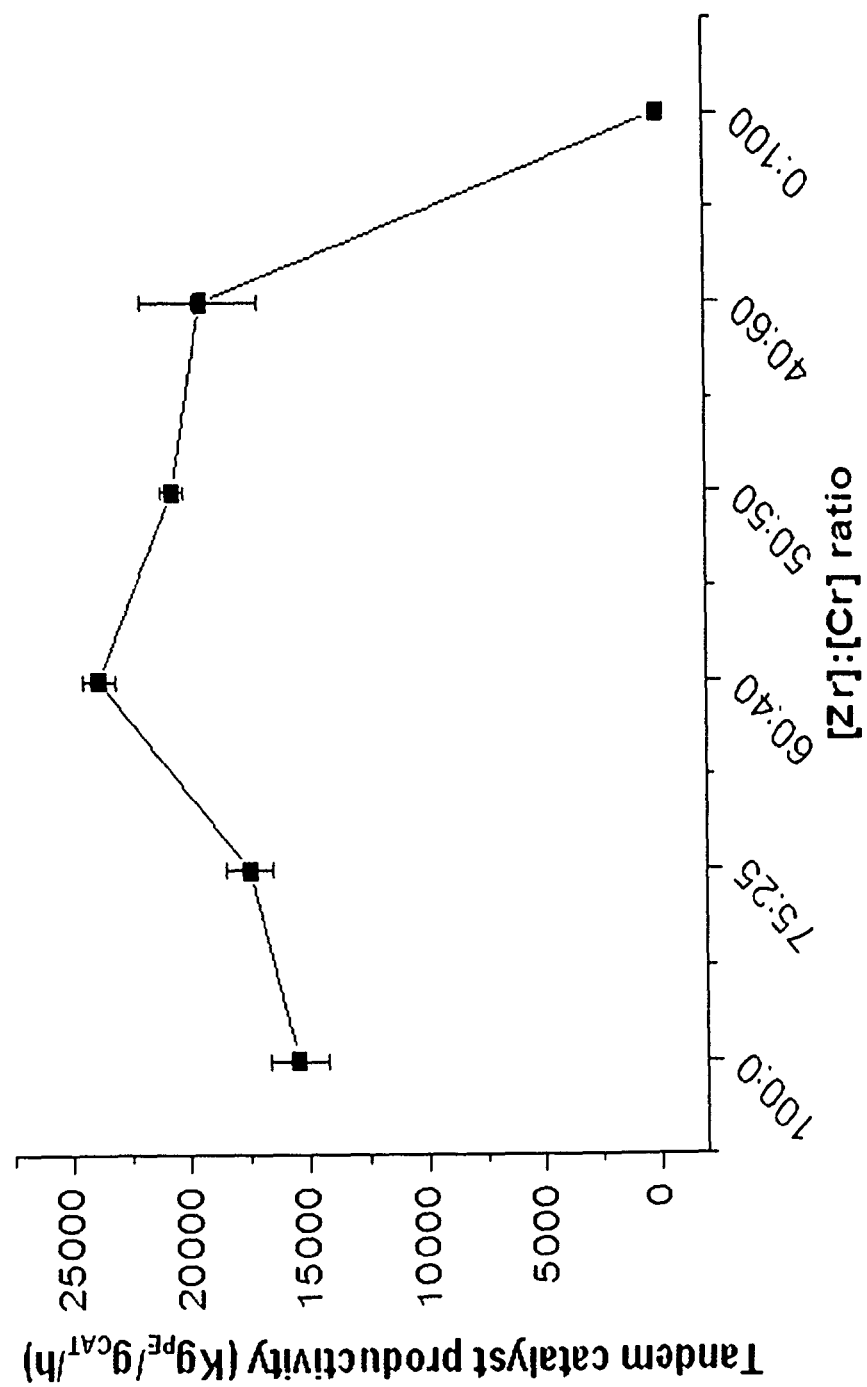
FIG. 9 illustrates the dependency of molar ratio of first and second transition metal catalyst on activity; polymerisation of ethylene using SMAO/[(EBI)ZrCl$_2$]:[Pn*(H)CrCl$_2$]$_2$ catalysts with various molar ratio under the condition: 10 mg of catalyst, 2 bar, 1 hour, 60° C., 150 mg of TIBA, Hexane (50 mL), SMAO.

Table 9 and FIG. 9 show that when using SMAO/[(EBI)$ZrCl_2$]:[Pn*(H)$CrCl_2$]$_2$, the molar ratio of 60:40 provided the highest activity (23784 $kg_{PE}/mol_{Zrcomplex}/h$). All system compositions that include [PN*(H)$CrCl_2$]$_2$ demonstrate a higher activity than the 100:0 molar ratio. Negligible activity was observed when the molar ratio was 0:100 (i.e. no [(EBI)$ZrCl_2$] was present).

I. Comparison of Molar Ratio of [Transition Metal 1]/[Transition Metal 2] in the Tandem System and Mixing Separate Systems Using LDHMAO.

To try to understand the synergistic effect on activity observed at different molar ratios of transition metal 1/transition metal 2, the relative ratio was varied, whilst maintaining a total $[Al]_0/[M]_0$ of 100; these values for activity were then compared to polymerisation runs where the $[Al]_0/[M]_0$ of 100 and molar ratios of transition metal 1/transition metal 2 were maintained but the transition metal complexes 1 and 2 were separately supported on LDHMAO and mixed together prior to polymerisation. The results are collated in Table 10 and FIG. 10.

TABLE 10

Polymerisation of ethylene using support/[(EBI)$ZrCl_2$]:[Pn*)H)$CrCl_2$]$_2$
catalyst and mixed support/[(EBI)$ZrCl_2$] and support/[Pn*(H)$CrCl_2$]$_2$
catalysts under the condition: 10 mg of catalyst, 2 bar ethylene,
1 hour, 60° C., 150 mg of TIBA, Hexane (50 mL).

| Complex 1 | Complex 2 | Molar Ratio (Complex 1:Complex 2) | Tandem Catalyst Activity $kg_{PE}/mol_{Zrcomplex}/h$ | Mixed Catalyst Activity $kg_{PE}/mol_{Zrcomplex}/h$ |
|---|---|---|---|---|
| [(EBI)$ZrCl_2$] | [Pn*(H)$CrCl_2$]$_2$ | 100:0 | 2381 | 2381 |
| [(EBI)$ZrCl_2$] | [Pn*(H)$CrCl_2$]$_2$ | 75:25 | 3860 | 2694 |
| [(EBI)$ZrCl_2$] | [Pn*(H)$CrCl_2$]$_2$ | 50:50 | 3718 | 3065 |
| [(EBI)$ZrCl_2$] | [Pn*(H)$CrCl_2$]$_2$ | 40:60 | 2669 | 3123 |
| [(EBI)$ZrCl_2$] | [Pn*(H)$CrCl_2$]$_2$ | 0:100 | negligible | Negligible |

LDHMAO = acetone-dispersed MgAl—$CO_3$ LDH treated with MAO

Figure 10:
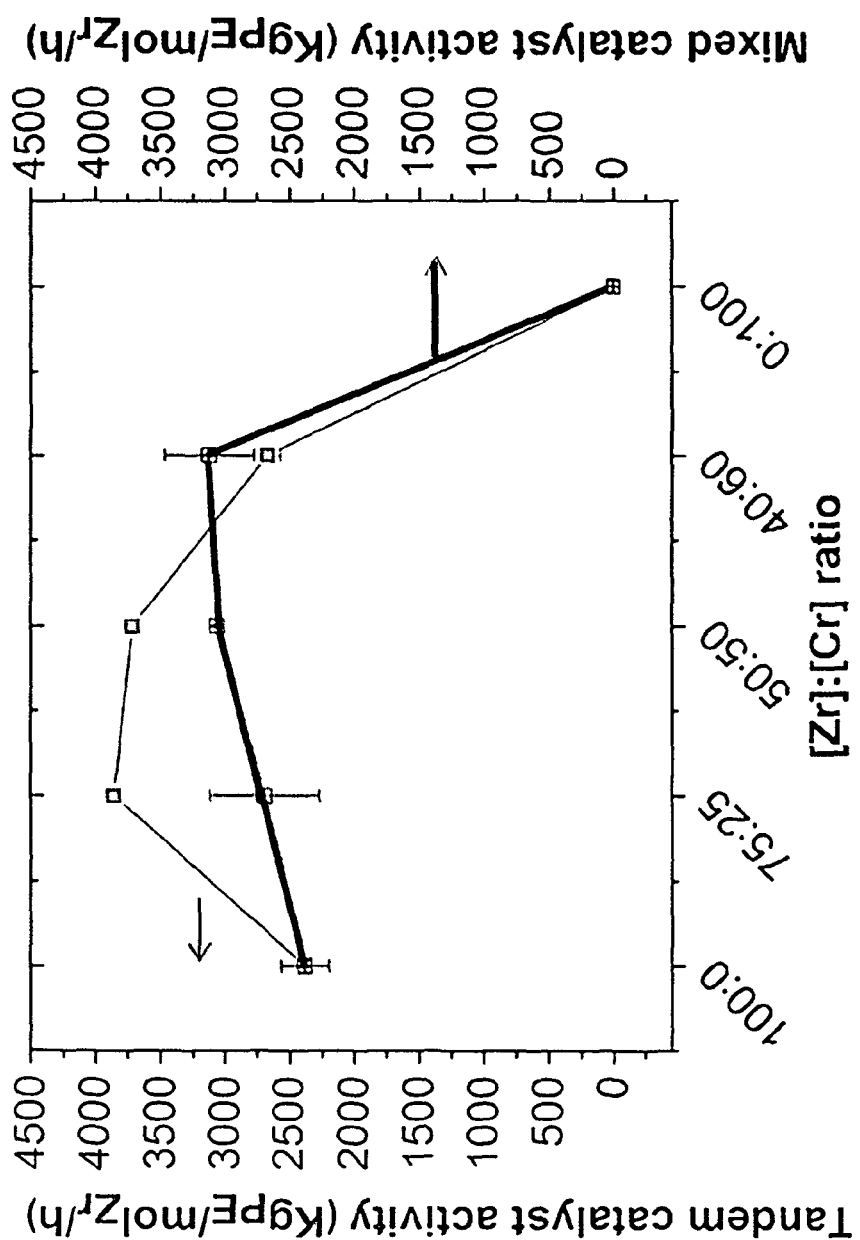
FIG. 10 illustrates a comparison of molar ratio of [Transition metal 1]/[Transition metal 2] in the tandem system (LDHMAO/[(EBI)ZrCl$_2$]:[Pn*(H)Cr Cl$_2$]$_2$ and mixing separate systems (LDHMAO/[(EBI)ZrCl$_2$]:[Pn*(H)CrCl$_2$]$_2$ and LDHMAO/[Pn*(H)CrCl$_2$]$_2$) using LDHMAO under the condition: 10 mg of catalyst, 2 bar, 1 hour, 60° C., 150 mg of TIBA, Hexane (50 mL), LDH: MgAl—CO$_3$.
Figure 11:
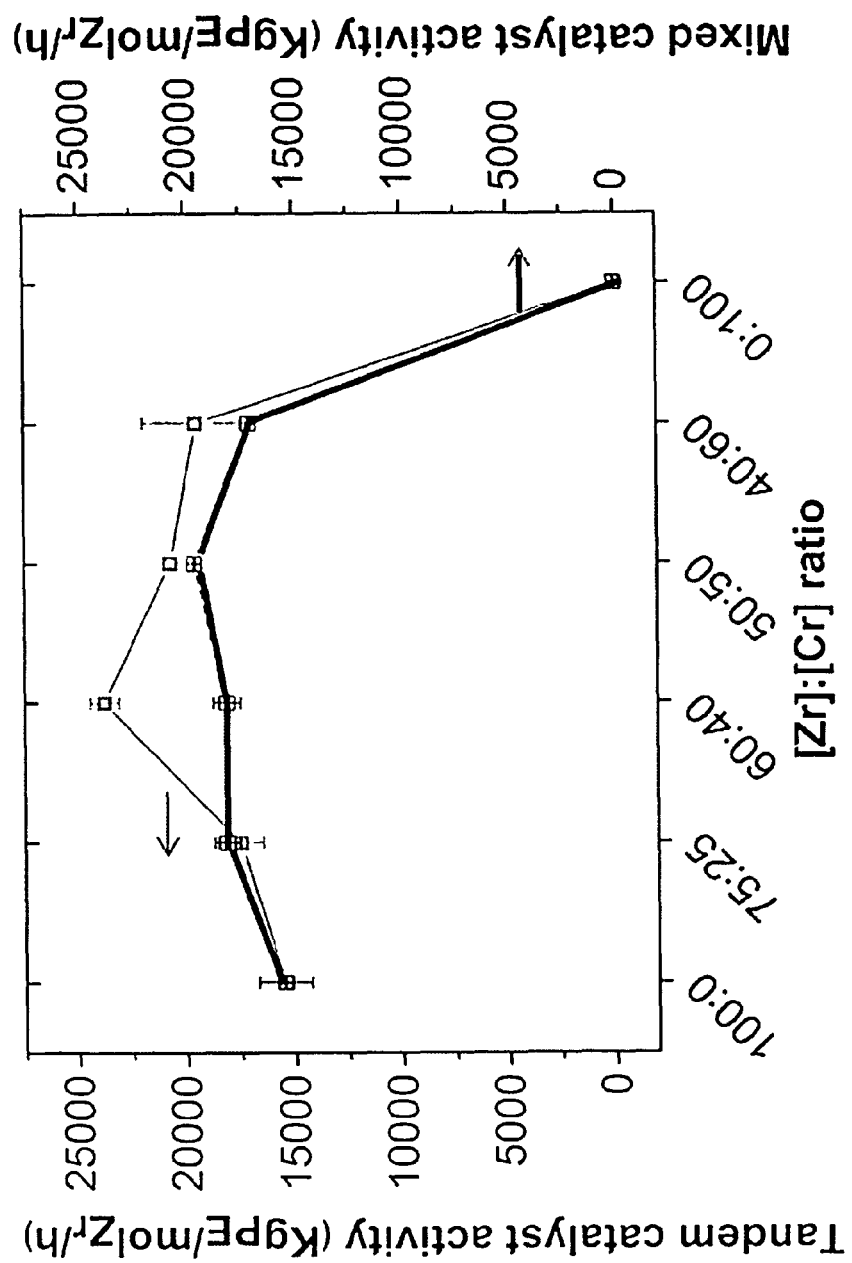
FIG. 11 illustrates a comparison of molar ratio of [Transition metal 1]/[Transition metal 2] in the tandem system (LDHMAO/[(EBI)ZrCl$_2$]:[Pn*(H)Cr Cl$_2$]$_2$) and mixing separate systems (LDHMAO/[(EBI)ZrCl$_2$]:[Pn*(H)CrCl$_2$]$_2$ and LDHMAO/[Pn*(H)CrCl$_2$]$_2$ using SMAO under the condition: 10 mg of catalyst, 2 bar, 1 hour, 60° C., 150 mg of TIBA, Hexane (50 mL), SMAO.

Table 10 and FIG. 10 show that for transition metal 1/transition metal 2 ratios of 75:25 and 50:50, the activity is significantly higher when using LDHMAO/[(EBI)ZrCl$_2$]: [Pn*(H)CrCl$_2$]$_2$ than the corresponding mixed catalysts in the same molar ratio. This demonstrates a clear synergistic effect at these ratios. For a transition metal 1/transition metal 2 ratio of 40:60, the values for activity are the same within error. All system compositions that include [Pn*(H)CrCl$_2$]$_2$ demonstrate a higher activity than the 100:0 molar ratio. Negligible activity was observed when the molar ratio was 0:100 (i.e. no [(EBI)ZrCl$_2$] was present).

J. Comparison of Molar Ratio of [Transition metal 1]/ [Transition metal 2] in the Tandem System and Mixing Separate Systems Using SMAO.

To try to understand the synergistic effect on activity observed at different molar ratios of transition metal 1/transition metal 2, the relative ratio was varied, whilst maintaining a total [Al]$_0$/[M]$_0$ of 300; these values for activity were then compared to polymerisation runs where the [Al]$_0$/[M]$_0$ of 300 and molar ratios of transition metal 1/transition metal 2 were maintained but the transition metal complexes 1 and 2 were separately supported on SMAO and mixed together prior to polymerisation. The results are collated in Table 11 and FIG. 10.

TABLE 11

Polymerisation of ethylene using support/[(EBI)ZrCl$_2$]:[Pn*(H)CrCl$_2$]$_2$ catalyst and mixed support/[(EBI)ZrCl$_2$] and support/[Pn*(H)CrCl$_2$]$_2$ catalysts under the condition: 10 mg of catalyst, 2 bar ethylene, 1 hour, 60° C., 150 mg of TIBA, Hexane (50 mL).

| Complex 1 | Complex 2 | Molar Ratio (Complex 1:Complex 2) | Tandem Catalyst Activity kg$_{PE}$/mol$_{Zrcomplex}$/h | Mixed Catalyst Activity kg$_{PE}$/mol$_{Zrcomplex}$/h |
|---|---|---|---|---|
| [(EBI)ZrCl$_2$] | [Pn*(H)CrCl$_2$]$_2$ | 100:0 | 15459 | 15459 |
| [(EBI)ZrCl$_2$] | [Pn*(H)CrCl$_2$]$_2$ | 75:25 | 17482 | 18102 |
| [(EBI)ZrCl$_2$] | [Pn*(H)CrCl$_2$]$_2$ | 60:40 | 23784 | 18119 |
| [(EBI)ZrCl$_2$] | [Pn*(H)CrCl$_2$]$_2$ | 50:50 | 20688 | 19558 |
| [(EBI)ZrCl$_2$] | [Pn*(H)CrCl$_2$]$_2$ | 40:60 | 19466 | 17053 |
|  |  | 0:100 | negligible | Negligible |

SMAO = solid methylaluminoxane

Table 11 and FIG. 10 show that for transition metal 1/transition metal 2 ratios of 60:40 and 50:50, the activity is significantly higher (when using SMAO/[EBI)ZrCl$_2$]:[Pn*(H)CrCl$_2$]$_2$) than the corresponding mixed catalysts in the same molar ratio. This demonstrates a clear synergistic effect at these ratios. For a transition metal 1/transition metal 2 ratio of 75:25 and 40:60, the values for activity are the same within error. AU system compositions that include [Pn*(H)CrCl$_2$]$_2$ demonstrate a higher activity than the 100:0 molar ratio. Negligible activity was observed when the molar ratio was 0:100 (i.e. no [(EBI)ZrCl$_2$] was present).

Given both the interesting activity boost of the tandem systems compared to the traditional zirconium-based systems, and the potential to produce higher value copolymers from a single ethylene feed, new chromium components to the tandem systems were first investigated.

Using the same methodology, 10 new systems were initially prepared from (EBI)ZrCl$_2$ and [Cp*CrCl$_2$]$_2$ or [Cp-CrCl$_2$]$_2$, immobilised on solid MAO, based on [Zr]:[Cr] ratios of 0:100, 40:60, 50:50, 40:60 and 75:25, where [Al]$_{MAO}$/([Cr]+[M])$_0$=300.

Figure 12:
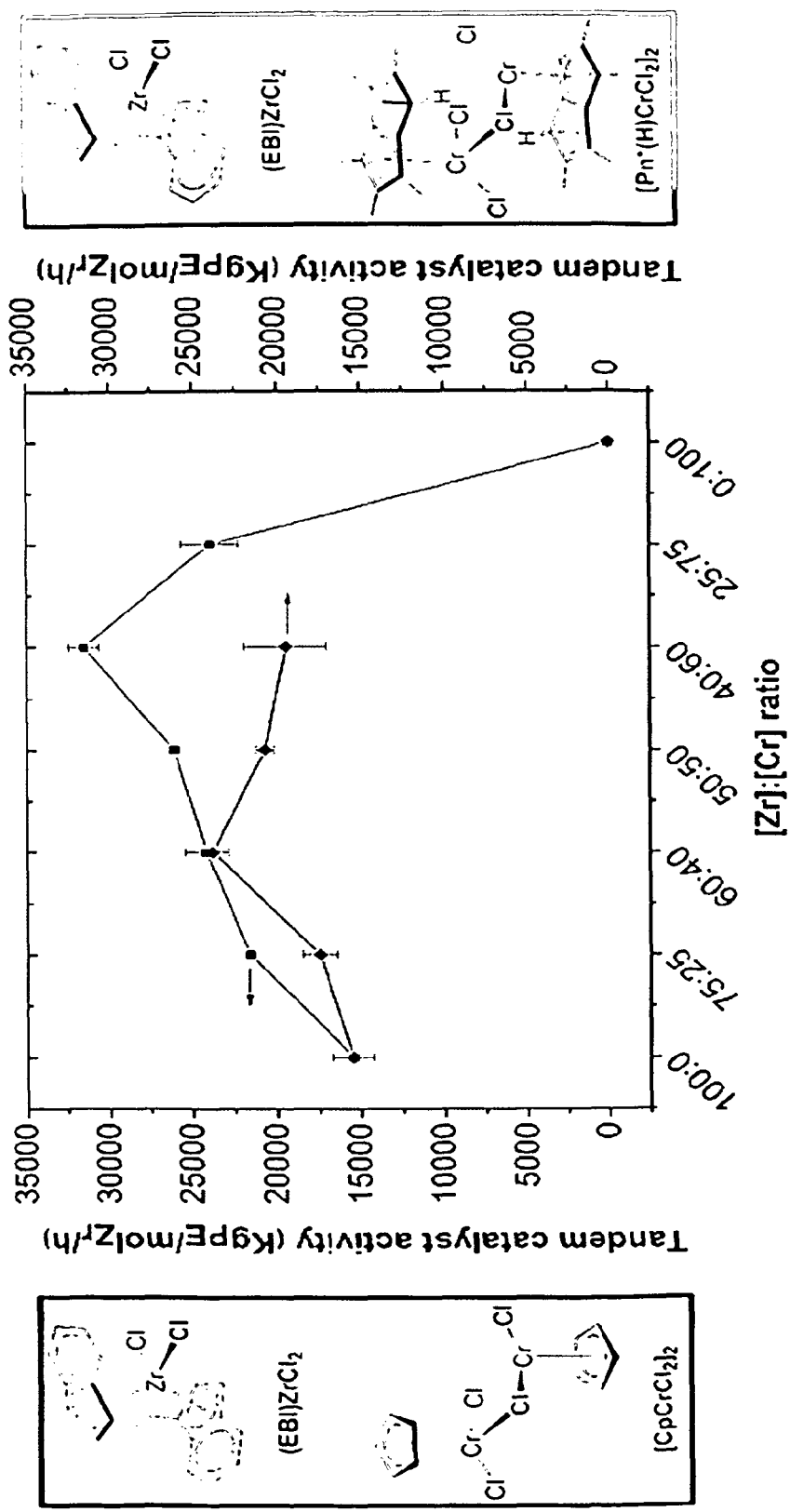
FIG. 12 illustrates an effect on polymerisation activity when [Zr]:[Cr] ratio is modified. SMAO—[Zr][Cr] catalysts with various molar ratios under the conditions: 10 mg of catalyst, 2 bar, 1 h, 60° C., 150 mg TIBA, Hexane (50 mL). [Al]$_{MAO}$/([Cr]+[M])$_0$=300.

Ethylene polymerisation runs were carried out using all of the systems using the standard conditions of 10 mg of catalyst, 2 bar ethylene, 1 hour, 60° C., 150 mg TIBA, Hexane (50 mL). The SMAO—[Zr][[CpCrCl$_2$]$_2$] system is compared to SMAO—[Zr][[Pn*(H)CrCl$_2$]$_2$] in FIG. 12.

The [CpCrCl$_2$]$_2$-based system clearly outperforms the [Pn*(H)CrCl$_2$]$_2$-based system at almost all [Zr]:[Cr] ratios (apart from 60:40, where they are the same within error), and catalyst activity increases with decreasing [Zr]:[Cr] ratio up to the point of 40:60. The all chromium system with [Zr]:[Cr] of 0:100 produces negligible amounts of polymer.

Figure 13:
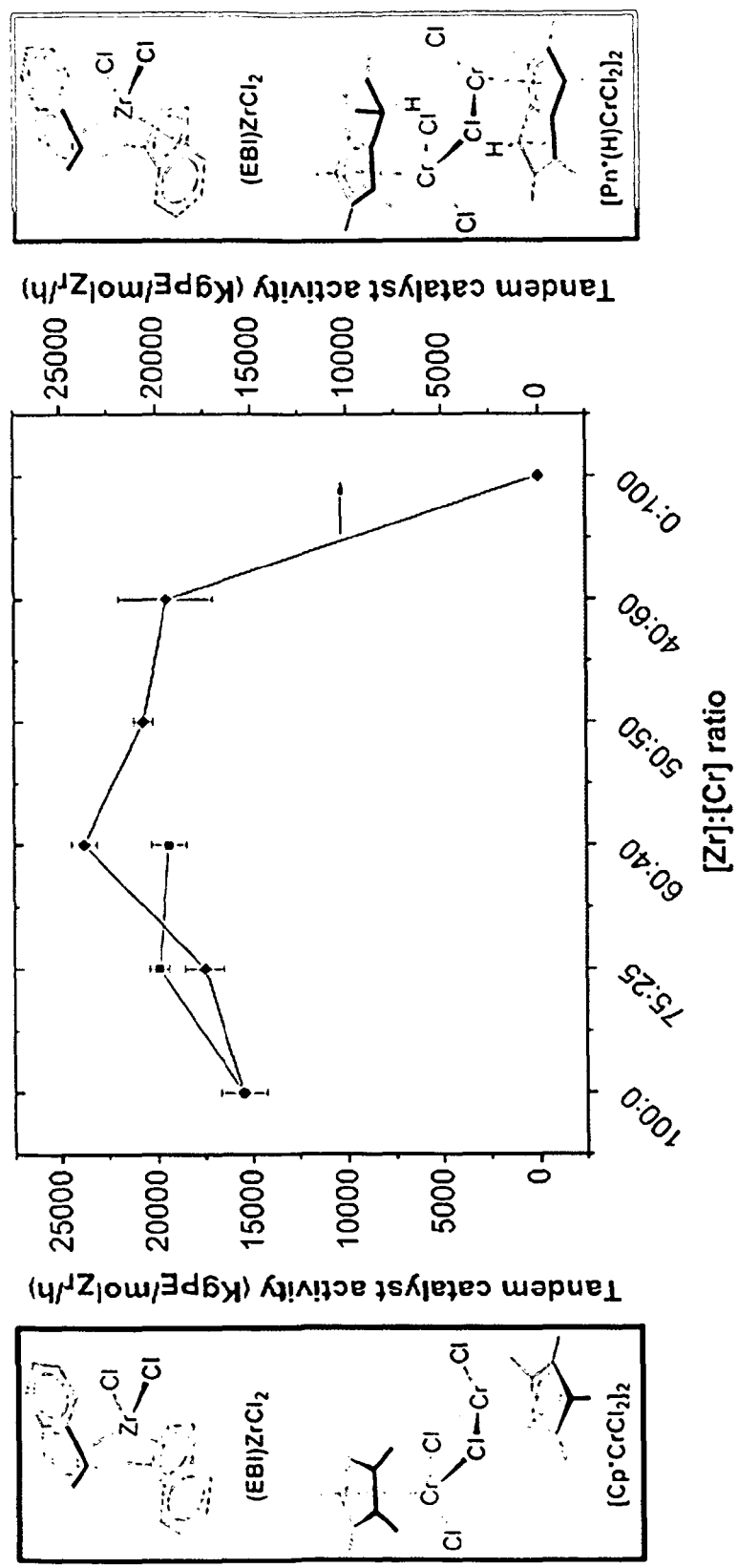
FIG. 13 illustrates an effect on polymerisation activity when [Zr]:[Cr] ratio is modified. SMAO—[Zr][Cr] catalysts with various molar ratios under the conditions: 10 mg of catalyst, 2 bar, 1 h, 60° C., 150 mg TIBA, Hexane (50 mL). [Al]$_{MAO}$/([Cr]+[M])$_0$=300.

Studies carried out on the [Cp*CrCl$_2$]$_2$-based system found the peak activity to be at a ratio of 75:25. At this point, this catalyst did indeed outperform the [Pn*(H)CrCl$_2$]$_2$ system but activity declined after this point with decreasing [Zr]:[Cr] ratio. The importance of the stereoelectronics of the chromium complex are clearly illustrated by this result (FIG. 13).

Figure 14:
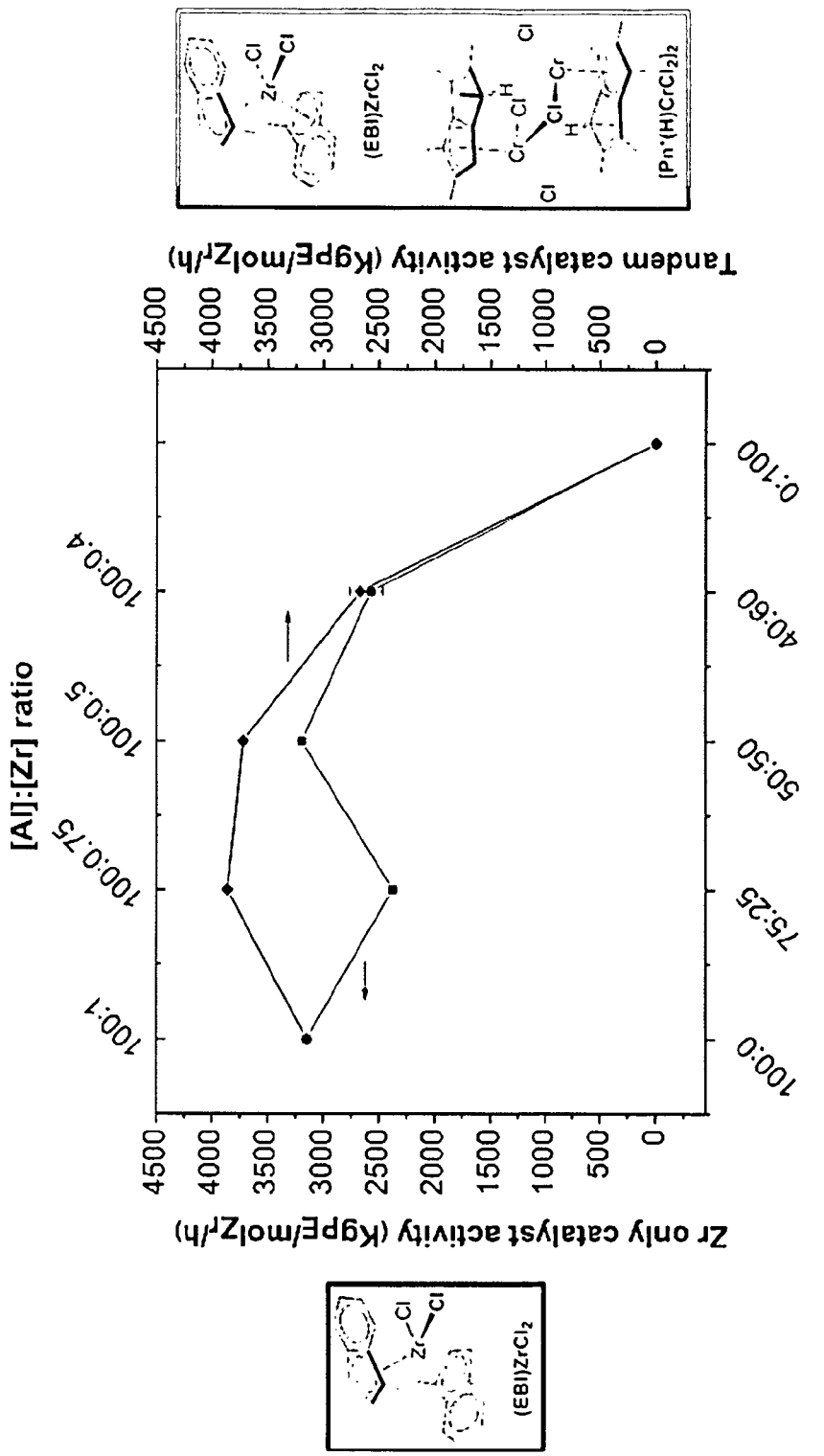
FIG. 14 illustrates an effect on polymerisation activity when LDHMAO—[Zr] systems are prepared containing the same molar amount of [Zr] to the tandem catalysts analogue. Conditions: 10 mg of catalyst, 2 bar, 1 h, 60° C., 150 mg TIBA, Hexane (50 mL). [Al]$_{MAO}$/([Cr]+[M])$_0$=100, LDH=AMO—MgAlCO$_3$.

Another key control experiment to ascertain the role of the chromium in the tandem systems prepared was carried out. LDHMAO-based-catalyst systems were prepared that contained a comparable amount of [Zr] to a particular tandem system but with no [Cr] component (For example, if the tandem system composition was [Al]:[Zr]:[Cr]=100: 0.75; 0.25, the the Zr-only analogue prepared was [Al]:[Zr]: [Cr]=100:015:0). Ethylene polymerisation studies were then completed. In these systems, it is important to determine whether with increasing polymerisation activity seen with decreasing [Zr]:[Cr] ratio is a result of the synergistic system itself or more simply a result of the concomitant increase in [Al]:[Zr] ratio. The data are presented in FIG. 14 and compare tandem systems, LDHMAO—[Zr]:[Cr], with their [Zr]-only analogues, LDHMAO—[Zr].

The data clearly show that the tandem system is better at all ratios (except for [Zr]:[Cr]=40:60) and that despite the increasing [Al]:[Zr] ratio, the LDHMAO—[Zr] catalyst system does not result in an increase in activity. The data again clearly points to the importance of both metals in the tandem systems prepared.

Gel permeation chromatography data for the LDHMAO- and SMAO—[Zr][Cr] systems ([Zr]=(EBIZrCl$_2$), [Cr]= [(Pn*(H)CrCl$_2$]$_2$) were recorded and the data, as a function of [Zr]:[Cr] ratio is depicted in FIG. 15. There are significant variations in the molecular weights recorded for the samples produced by LDHMAO—[Zr][Cr] systems which are much higher than the samples produced by SMAO—[Zr][Cr] systems, which show little effect of varying the [Zr]:[Cr] ratio.

Fresh samples of sMAO—[Zr]$_{60}$[Cr]$_{40}$ ([Zr]:[Cr]=60:40) and sMAO—[Zr]$_{50}$[Cr]$_{50}$ ([Zr]:[Cr]—50:50), where [Zr]= (EBI)ZrCl$_2$ and [Cr]=[Pn*(H)CrCl$_2$]$_2$, were prepared and tested in a 2 L reactor polymerisation. These complexes represented high activity for the tandem systems and they were chosen for this reason. The productivity data of the polymerisations are summarised in Table 12.

As expected, productivity increased with increasing pressure and temperature. Interestingly, the system with ratio [Zr]:[Cr]=50:50 outperformed the 60:40 system at 6 and 8 bar of ethylene. Catalyst testing in glass ampoules at 2 bar showed the opposite optimum system.

Fresh samples of sMAO—$[Zr]_{60}[Cr]_{40}$ ([Zr]:[Cr]=60:40) and sMAO—$[Zr]_{50}[Cr]_{50}$ ([Zr]:[Cr]—50:50), where [Zr]= (EBI)ZrCl$_2$ and [Cr]=[Pn*(H)CrCl$_2$]$_2$, were prepared and tested in a 2 L reactor polymerisation. These complexes represented high activity for the tandem systems and they were chosen for this reason. The productivity data of the polymerisations are summarised in Table 12.

As expected, productivity increased with increasing pressure and temperature. Interestingly, the system with ratio [Zr]:[Cr]=50:50 outperformed the 60:40 system at 6 and 8 bar of ethylene. Catalyst testing in glass ampoules at 2 bar showed the opposite optimum system.

Polymerisation ethylene uptake data was recorded for these runs and an example is shown in FIG. 16. Uptake is high at the ethylene pressure increases but it is also important to note that the uptake remains remarkably stable over the course of 1 hour when quenching occurs.

Gel permeation chromatography data was collected on the polymers produced by sMAO—$[Zr]_{60}[Cr]_{40}$ and sMAO—$[Zr]_{50}[Cr]_{50}$ at 80° C. and 4, 6 and 8 bar. The data show that the molecular weights ($M_w$) are significantly higher when the catalyst with an increased [Zr]:[Cr] ratio is used (FIG. 17). The molecular weights also displayed a more general trend of increasing with in Temperature Rising Elution Fractionation (TREF) data was collected in order to better understand the nature of the polymers produced by the tandem systems. The effect of changing pressure at a constant temperature of 80° C. for sMAO—$[Zr]_{60}[Cr]_{40}$ is displayed in FIG. 18. As pressure increases, $T_m$ is observed to increase, suggesting that the relative rate of polymerisation to oligomerisation increases.

The effect of changing temperature at a constant pressure of 8 bar for sMAO—$[Zr]_{60}[Cr]_{40}$ is displayed in FIG. 19. As temperature increases, $T_m$ increases. Further data over a wider temperature range would need to be collected in order to see if this trend is more widely applicable.

Creasing Ethylene Pressure.

$^{13}C\{^1H\}$ NMR spectroscopic data was collected in order to further our understanding of the polymer microstructures obtained. Selected spectra are presented in FIGS. 20 and 21. Both spectra indicate the presence of low levels (up to 0.28% total) of octene and butene incorporation. Despite the low levels, this is very encouraging and is more evidence to confirm that the tandem catalysis system is based on the zirconium centre carrying polymerisation in synergy with the chromium centre carrying out oligomerisation.

Differential scanning calorimetry (DSC) data was collected on the polymer samples produced by the sMAO—[Zr][Cr] systems (FIG. 22). The data show pressure dependent peak temperature values; traces of ethylene/1-hexene copolymers are included for reference.

The features disclosed in the foregoing description, in the claims and in the accompanying drawings may both separately or in any combination thereof be material for realizing the invention in diverse forms thereof.

The invention claimed is:

1. A synergistic dual olefin copolymerisation catalyst system comprising a solid support material having, on its surface, two or more catalytic metal complexes wherein the two or more catalytic metal complexes comprise at least one first transition metal complex and a second transition metal complex different from the first transition metal complex, wherein the first transition metal complex is an olefin polymerisation catalyst and the second transition metal complex is an olefin oligomerisation catalyst, and wherein the second transition metal complex is a transition metal-permethylpentalene derived complex.

2. The system according to claim 1, wherein the second transition metal complex is a chromium containing complex.

3. The system according to claim 1, wherein the second transition metal complex is a chromium-permethylpentalene derived complex.

4. The system according to claim 1, wherein the first transition metal complex is at least one complex of a metal selected from zirconium, iron, chromium, cobalt, nickel, titanium and hafnium containing one or more aromatic or heteroaromatic ligands.

5. The system according to claim 2, wherein first transition metal complex is at least one complex selected from

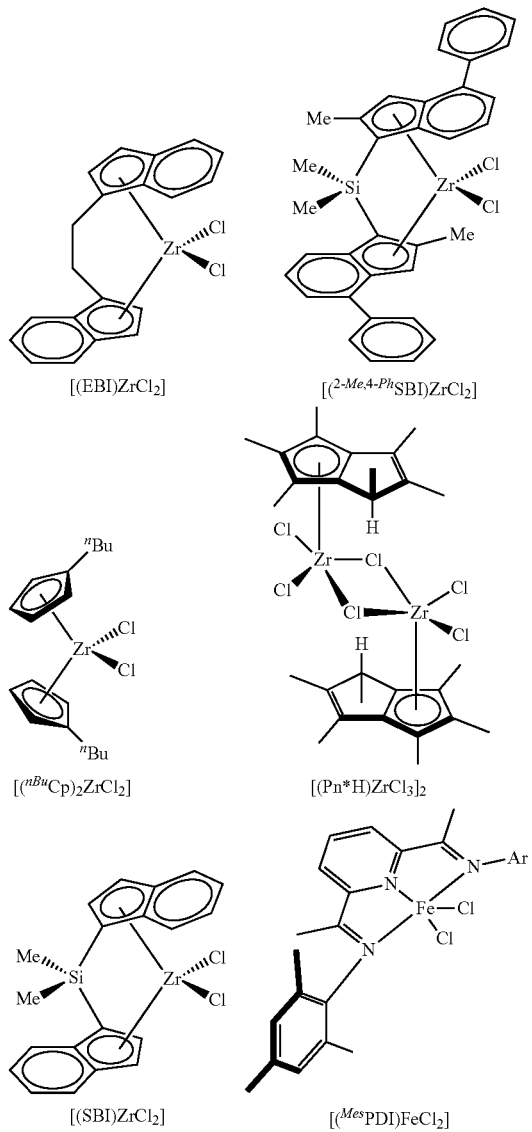

-continued

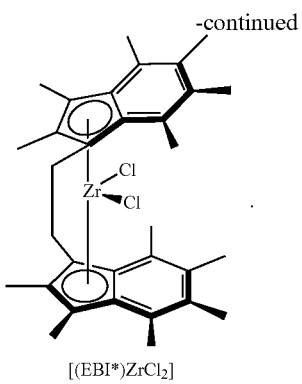

[(EBI*)ZrCl₂]

6. The system according to claim 1, wherein the second transition metal complex is a complex of chromium and a ligand derived from permethylpentalene having the formula [Pn*(H)CrCl₂]₂, where Pn* is a permethylpentalene moiety.

7. The system according to claim 1, wherein the solid support material is selected from a layered double hydroxide activated with an alkylaluminoxane, silica activated with an alkylaluminoxane, and solid alkylaluminoxane.

8. The system according to claim 7, wherein the alkylaluminoxane is methylaluminoxane.

9. The system according to claim 1, wherein the weight or molar ratio of the first transition metal complex to the second transition metal complex is from 95:5 to 50:50.

10. A process for producing a polymer of an olefin which comprises contacting the olefin with a synergistic dual solid catalyst system comprising a solid support material having, on its surface, two or more catalytic metal complexes wherein the two or more catalytic metal complexes comprise at least one first transition metal complex and a second transition metal complex different from the first transition metal complex, wherein the first transition metal complex is an olefin polymerisation catalyst and the second transition metal complex is an olefin oligomerisation catalyst, and wherein the second transition metal complex is a transition metal-permethylpentalene derived complex.

11. The process according to claim 10, wherein the olefin is ethylene.

12. The process according to claim 10, wherein the polymer is a copolymer.

13. The process according to claim 11, wherein the polymer is a copolymer.

14. The system according to claim 1, wherein the weight or molar ratio of the first transition metal complex to the second transition metal complex is from 90:10 to 70:30.

15. The system according to claim 1, wherein the weight or molar ratio of the first transition metal complex to the second transition metal complex is from 90:10 to 75:25.

* * * * *